US006547688B2

United States Patent
Takagi et al.

(10) Patent No.: US 6,547,688 B2
(45) Date of Patent: Apr. 15, 2003

(54) AUTOMATIC TRANSMISSION

(75) Inventors: Kiyoharu Takagi, Okazaki (JP); Yoshiyuki Onimaru, Nagoya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/983,619

(22) Filed: Oct. 25, 2001

(65) Prior Publication Data

US 2002/0086765 A1 Jul. 4, 2002

(30) Foreign Application Priority Data

Oct. 25, 2000 (JP) ........................................ 2000-325012
Nov. 28, 2000 (JP) ........................................ 2000-361363

(51) Int. Cl.$^7$ ................................................ F16H 3/62
(52) U.S. Cl. ..................... 475/276; 475/279; 475/282; 475/284; 475/286
(58) Field of Search ................................ 475/279, 282, 475/286, 290, 276, 280, 284

(56) References Cited

U.S. PATENT DOCUMENTS

| 3,946,623 | A | * | 3/1976 | Murakami et al. | ........... 475/286 |
|---|---|---|---|---|---|
| 3,946,624 | A | * | 3/1976 | Murakami et al. | ........... 475/290 |
| 4,004,473 | A | * | 1/1977 | Pearce et al. | ............... 475/276 |
| 4,027,552 | A | * | 6/1977 | Murakami et al. | ........... 475/286 |
| 4,089,239 | A | * | 5/1978 | Murakami et al. | ........... 475/279 |
| 4,205,563 | A | * | 6/1980 | Gorrell | ....................... 475/282 |
| 5,460,579 | A | | 10/1995 | Kappel et al. | |
| 5,989,148 | A | * | 11/1999 | Park | ........................... 475/282 |
| 6,071,208 | A | * | 6/2000 | Koivunen | ................... 475/276 |
| 6,083,135 | A | * | 7/2000 | Baldwin et al. | ............ 475/276 |
| 6,176,803 | B1 | * | 1/2001 | Meyer et al. | ............... 475/286 |
| 6,342,026 | B1 | * | 1/2002 | Takagi et al. | ................ 475/286 |

FOREIGN PATENT DOCUMENTS

| JP | 2000-234655 A | 8/2000 |
|---|---|---|
| KP | 6-323381 A | 11/1994 |

* cited by examiner

Primary Examiner—Sherry Estremsky
(74) Attorney, Agent, or Firm—Burns, Doane, Swecker & Mathis, LLP

(57) ABSTRACT

A vehicle automatic transmission includes an input shaft connected to an output shaft of an engine, an output shaft, and a torque converter for transmitting driving torque from the engine to the automatic transmission. A planetary gear system of the automatic transmission is provided with first, second, third and fourth planetary gear sets. The first gear set has a first sun gear, a first ring gear, a pair of first pinion gears, and a first planetary carrier. The second, third and fourth gear sets respectively have second, third and fourth sun gears, second, third and fourth ring gears, second, third and fourth single pinion gears, and second, third and fourth planetary carriers. The planetary gear system is further provided with four rotational elements, two clutches, and three brakes.

13 Claims, 15 Drawing Sheets

AUTOMATIC TRANSMISSION

This application is based on claims priority under 35 U.S.C. § 119 with respect to Japanese Patent Application No. 2000-325012 filed on Oct. 25, 2000 and Japanese Patent Application No. 2000-361363 filed on Nov. 28, 2000, the entire content of both of which is incorporated herein by reference.

FIELD OF THE INVENTION

This invention generally relates to an automatic transmission. More particularly, the present invention pertains to an automatic transmission for a vehicle that supplies six forward shift stages.

BACKGROUND OF THE INVENTION

An automatic transmission provided with six forward shift stages is disclosed in Japanese Patent Laid-Open Application No. 6(1994)-323381 and Japanese Patent Laid-Open Application No. 2000-234655. The automatic transmission disclosed in Japanese Patent Laid-Open Application No. 6(1994)-323381 is designed to supply gear ratios (1.90, 1.914) via a second shift stage which are smaller than a gear ratio 2.

The automatic transmission described in Japanese Patent Laid-Open Application No. 2000-234655 is designed to supply a gear ratio of 2.7 via a second shift stage. Accordingly, a gear ratio step between a first shift stage and the second shift stage may not be sufficiently large as expected or desired and the gear ratio step between the second shift stage and a third shift stage may be larger than expected or desired. Therefore, optimal gear ratio steps may not be easily generated between any of the shift stages.

It is thus seen that known automatic transmissions are susceptible of certain improvements with respect to generating optimal gear ratio steps between any of the shift stages in the automatic transmission.

SUMMARY OF THE INVENTION

An automatic transmission for a vehicle includes an input shaft connected to an output shaft of an engine, an output shaft connected to an axle shaft via a differential gear, and a torque converter for transmitting driving torque from the engine to the automatic transmission. A planetary gear system included in the automatic transmission is provided with first, second, third and fourth planetary gear sets. The first gear set has a first sun gear, a first ring gear, a pair of first pinion gears meshing with the first sun gear and the first ring gear, and a first planetary carrier rotatably supporting the first pinion gears. The first sun gear is connected to the input shaft. The second, third and fourth gear sets respectively have second, third and fourth sun gears, second, third and fourth ring gears, second, third and fourth single pinion gears meshing with each sun gear and ring gear, and second, third and fourth planetary carriers rotatably supporting the second, third and fourth pinion gears. The first and second ring gears and the third sun gear are rotatably connected by a first rotational element. The second, third and fourth planetary carriers are rotatably connected by a second rotational element. The third ring gear, the fourth sun gear and the output shaft are rotatably connected by a third rotational element. The second sun gear and the input shaft are rotatably connected by a fourth rotational element. A first clutch selectively connects and releases the second ring gear and the third sun gear, and a second clutch selectively connects and releases the second rotational element and the input shaft. A first brake selectively holds the first rotational element against rotation and releases the first rotational element, a second brake selectively holds the fourth ring gear against rotation and releases the fourth ring gear, and a third brake selectively holds the first planetary carrier against rotation and releases the first planetary carrier.

In an alternative construction, the first clutch selectively connects and releases the second and third planetary carriers. Another alternative involves the first planetary carrier being connected to the input shaft, and the third brake selectively holding the first sun gear against rotation and releasing the first sun gear. Another variation involves the first planetary carrier being connected to the input shaft, the first clutch selectively connecting and releasing the second and third planetary carriers, and the third brake selectively holding the first sun gear against rotation and releasing the first sun gear.

According to another aspect of the invention, an automatic transmission for a vehicle includes an input shaft connected to an output shaft of an engine, an output shaft connected to an axle shaft via a differential gear, a torque converter for transmitting driving torque from the engine to the automatic transmission, and a planetary gear system. The planetary gear system includes first, second, third and fourth planetary gear sets, with the first gear set having a first sun gear, a first ring gear, a pair of first pinion gears meshing with the first sun gear and the first ring gear, and a first planetary carrier rotatably supporting the first pinion gears. The first sun gear is connected to the input shaft, and the second, third and fourth gear sets respectively having second, third and fourth sun gears, second, third and fourth ring gears, second, third and fourth single pinion gears meshing with each sun gear and ring gear, and second, third and fourth planetary carriers rotatably supporting the second, third and fourth pinion gears. A first rotational element rotatably connects the first ring gear and the second sun gear, a second rotational element rotatably connects the second and fourth planetary carriers and the third ring gear, a third rotational element rotatably connects the second ring gear, the third planetary carrier and the fourth sun gear to the output shaft, a fourth rotational element is rotatably connected to the third sun gear, a first clutch selectively connects and releases the fourth rotational element and the input shaft, a second clutch selectively connects and releases the second rotational element and the input shaft, a first brake selectively holds the first rotational element against rotation and releases the first rotational element, a second brake selectively holds the fourth ring gear against rotation and releases the fourth ring gear, and a third brake selectively holds the first planetary carrier against rotation and releases the first planetary carrier.

In an alternative to this construction of the automatic transmission, the first clutch selectively connects and releases the second planetary carrier and the third ring gear, and the third sun gear and the input shaft are rotatably connected by the fourth rotational element. In another alternative, the first planetary carrier is designed to be constantly connected to the input shaft, and the third brake selectively holds the first sun gear against rotation and releases the first sun gear. According to another alternative, the first planetary carrier is designed to be constantly connected to the input shaft, the first clutch selectively connects and releases the second planetary carrier and the third ring gear, the third sun gear is rotatably connected to the input shaft by the fourth rotational element, and the third brake selectively holds the first sun gear against rotation and releases the first sun gear. In a further alternative, the second planetary carrier and the third ring gear are rotatably connected by the second rotational element, the second ring gear and the third and fourth planetary carriers are rotatably connected to the output shaft by the third rotational element, and the third and fourth sun gears are rotatably connected by the fourth rotational element. This construction can be varied so that the first planetary carrier is designed to be constantly connected to the input shaft, the second ring gear and the third and fourth carriers are rotatably connected to the output shaft by the third rotational element, the fourth sun gear is rotatably connected to the fourth rotational element, the second planetary carrier and the third ring gear are rotatably connected by the second rotational element, and the third brake selectively holds the first sun gear against rotation and releases the first sun gear.

According to another aspect of the invention, an automatic transmission for a vehicle includes an input shaft connected to an output shaft of an engine, an output shaft connected to an axle shaft via a differential gear, a torque converter for transmitting driving torque from the engine to the automatic transmission, and a planetary gear system having first, second and third planetary gear sets, with the first gear set having a first sun gear, a first ring gear, a pair of first pinion gears meshing with the first sun gear and the first ring gear, and a first planetary carrier rotatably supporting the first pinion gears. The second and third gear sets respectively have second and third sun gears, second and third ring gears, second and third single pinion gears meshing with each sun gear and ring gear, and second and third planetary carriers rotatably supporting the second and third pinion gears. A first rotational element rotatably connects the first ring gear and the second sun gear, and connects the second and third planetary gear sets, a second rotational element rotatably connects to the second planetary carrier, a third rotational element rotatably connects the third planetary carrier and the output shaft, and a fourth rotational element is connected to the third sun gear. A planetary gear unit includes the second and third planetary gear sets and the first, second, third and fourth rotational elements. The planetary gear unit connects the second planetary carrier and the third ring gear, and connects the second ring gear and the third planetary carrier. A first clutch selectively connects and releases the input shaft and the second rotational element, a second clutch selectively connects and releases the input shaft and the first sun gear, a third clutch selectively connects and releases the first sun gear and the first planetary carrier, a first brake selectively holds the first planetary carrier against rotation and releases the first planetary carrier, a second brake selectively holds the second rotational element against rotation and releases the second rotational element, and a third brake selectively holds the fourth rotational element against rotation and releases the fourth rotational element.

In an alternative to this construction, the planetary gear unit connects the second ring gear and the third planetary carrier, and further connects the second and third sun gears. The first rotational element is rotatably connected to the third ring gear, the second rotational element is rotatably connected to the second ring gear, the third rotational element is rotatably connected to the second planetary carrier, and the fourth rotational element is rotatably connected to the third sun gear. According to another alternative, the planetary gear unit rotatably connects the second and third planetary carriers, and rotatably connects the second ring gear and the third sun gear. In addition, the first rotational element is rotatably connected to the second ring gear, the second rotational element is rotatably connected to the second planetary carrier, the third rotational element is rotatably connected to the third ring gear, and the fourth rotational element is rotatably connected to the second sun gear.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
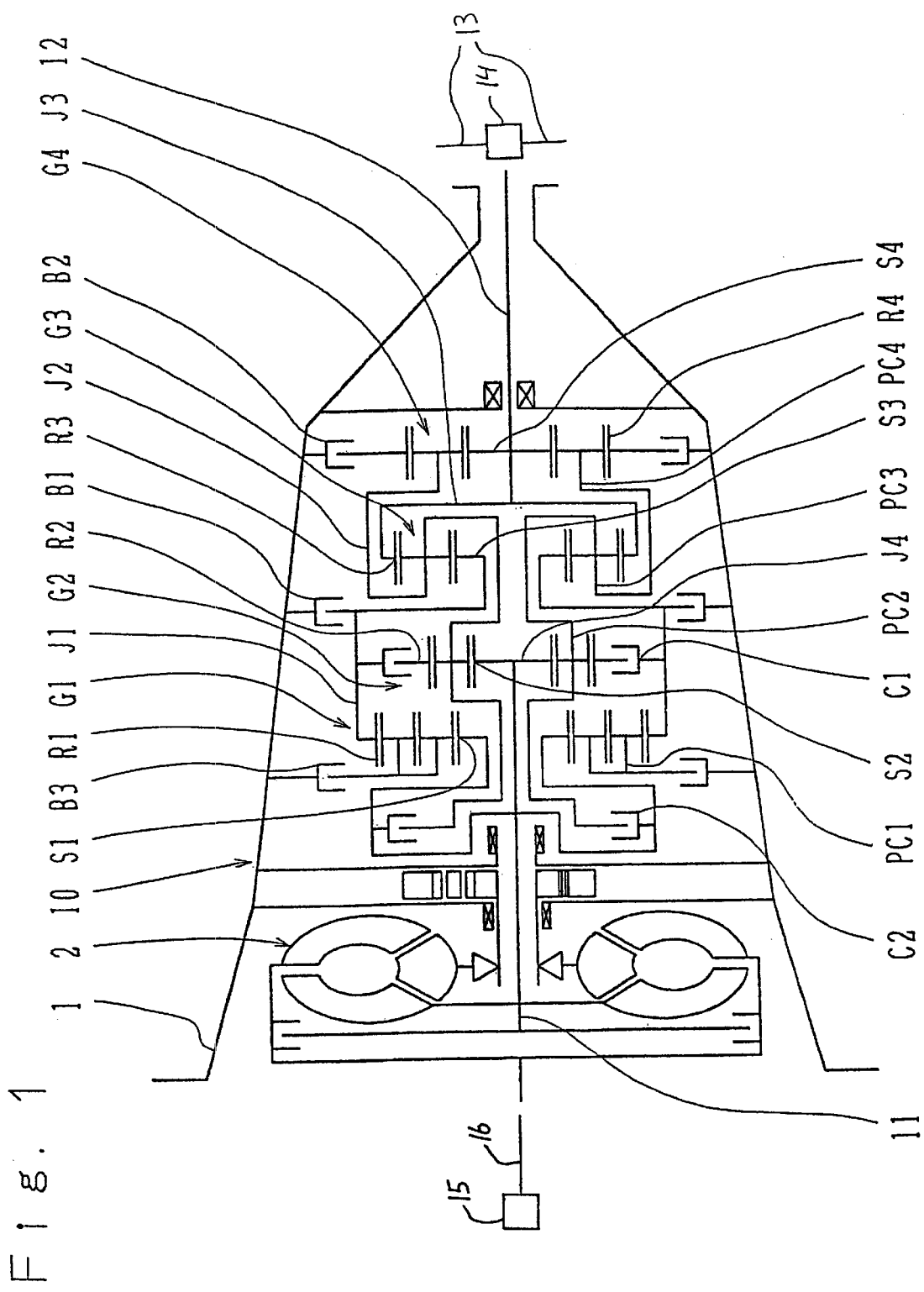
FIG. 1 is a schematic illustration of the planetary gear train of an automatic transmission according to a first embodiment of the present invention.

The automatic transmission 10 according to the various embodiments of the present invention is disposed in a housing 1. The automatic transmission 10 includes an input shaft 11 connected to an output shaft of a torque converter 2 and an output shaft 12 connected to an axle shaft 13 via a differential gear 14. The output force from an internal combustion engine 15 is transmitted by way of an engine output shaft 16 to the torque converter 2 via the shearing force of a viscous media. The output force from the torque converter 2 is transmitted to the transmission 10 via the input shaft 11 and is increased or decreased to effect at least six forward shift stages and a single rearward shift stage in response to a switching operation of friction elements disposed in the automatic transmission 10. The increased or decreased output force is transmitted to the axle shaft via the output shaft 12 and the differential gear.

A planetary gear train according to the first embodiment shown in FIG. 1 includes a first planetary gear set G1, a second planetary gear set G2, a third planetary gear set G3, and a fourth planetary gear set G4. The first gear set G1 includes a sun gear S1, a ring gear R1, and plural pairs of pinion gears. The sun gear S1 is designed to be constantly connected to the input shaft 11. A first pinion gear of the respective pairs of pinion gears is designed to be constantly meshed with the sun gear S1. A second pinion gear of the respective pairs of pinion gears is designed to be constantly meshed with the ring gear R1 and the first pinion gear. Each gear set G2, G3, G4 includes respective sun gears S2, S3, S4, ring gears R2, R3, R4, and plural single pinion gears. Each single pinion gear of each gear set G2, G3, G4 is designed to be constantly meshed with each sun gear S2, S3, S4 and each ring gear R2, R3, R4.

The ring gears R1, R2 and the sun gear S3 are rotatably connected by a first rotational element J1. Respective planetary carriers PC2, PC3, PC4 of respective gear sets G2, G3, G4 are rotatably connected by a second rotational element J2. The ring gear R3 and the sun gear S4 are rotatably connected to the output shaft 12 by a third rotational element J3. The sun gear S2 is rotatably connected to the input shaft 11 by a fourth rotational element J4.

The automatic transmission 10 further includes a first friction clutch C1, a second friction clutch C2, a first friction brake B1, a second friction brake B2 and a third friction brake B3. The clutches C1, C2 and the brakes B1, B2, B3 are hydraulically-actuated friction elements. The first clutch C1 selectively connects and releases the ring gear R2 and the sun gear S3, and the second clutch C2 selectively connects and releases the input shaft 11 and the rotational element J2. The first brake B1 selectively holds the rotational element J1 against rotation and releases the rotational element J1, the second brake B2 selectively holds the ring gear R4 against rotation and releases the ring gear R4, and the third brake B3 selectively holds the carrier PC1 against rotation and releases the carrier PC1. The engaging/disengaging operations of the friction elements C1, C2, B1, B2, B3 are respectively actuated in accordance with hydraulic pressure supplied to the friction elements.

A gear ratio in each planetary gear set G1, G2, G3, G4 is obtained in accordance with the following equations.

The gear ratio p 1 of the first planetary gear set G1:

p 1=the number of teeth of the sun gear S1/the number of teeth of the ring gear R1=0.556.

The gear ratio p 2 of the second planetary gear set G2:

p 2=the number of teeth of the sun gear S2/the number of teeth of the ring gear R2=0.44.

The gear ratio p 3 of the third planetary gear set G3:

p 3=the number of teeth of the sun gear S3/the number of teeth of the ring gear R3=0.46.

The gear ratio p 4 of the fourth planetary gear set G4:

p 4=the number of teeth of the sun gear S4/the number of teeth of the ring gear R4=0.34.

According to Table 1 below, the circle "◯" identifies an engaged friction clutch or an engaged friction brake. A blank identifies a disengaged friction clutch or a disengaged friction brake. Thus, the six forward shift stages and the single reverse shift stage are respectively effected by the engaging/disengaging condition of each of the friction elements C1, C2, B1, B2, B3.

TABLE 1

| Shift Stage | C1 | C2 | B1 | B2 | B3 | Gear Ratio<br>1 = 0.556<br>2 = 0.44<br>3 = 0.46<br>4 = 0.34 |
| --- | --- | --- | --- | --- | --- | --- |
| 1st | ◯ |  |  |  | ◯ | 3.941 |
| 2nd | ◯ |  | ◯ |  |  | 2.242 |
| 3rd | ◯ |  |  |  | ◯ | 1.445 |
| 4th | ◯ | ◯ |  |  |  | 1.000 |
| 5th |  | ◯ |  |  | ◯ | 0.796 |
| 6th |  | ◯ | ◯ |  |  | 0.685 |
| Rev. |  |  |  | ◯ | ◯ | 3.0824 |

Figure 2:
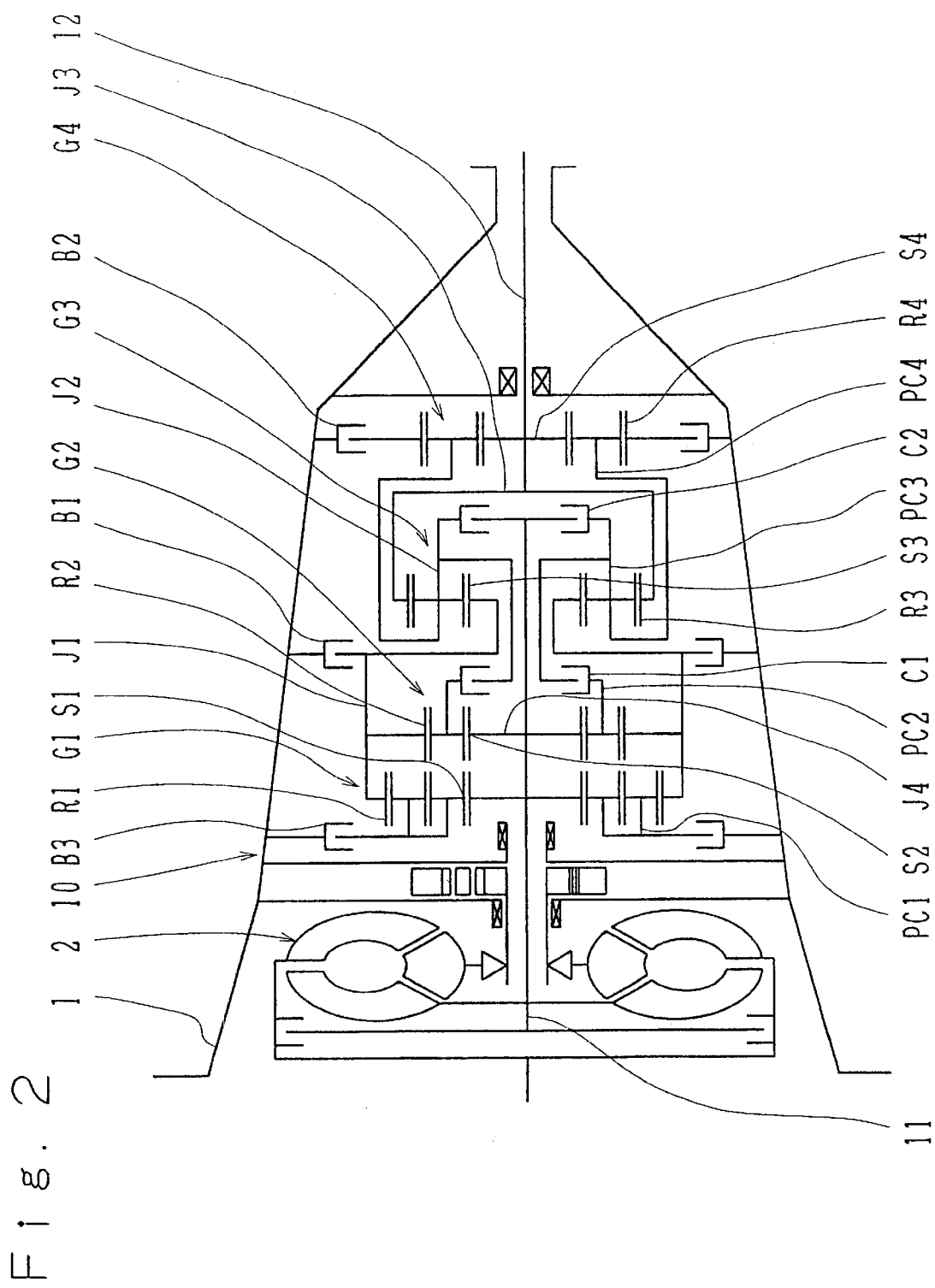
FIG. 2 is a schematic illustration of the planetary gear train of the automatic transmission according to a second embodiment of the present invention.

Referring to FIG. 2, the automatic transmission 10 according to a second embodiment is functionally and structurally the same as the automatic transmission 10 according to the first embodiment shown in FIG. 1, except for that the clutch C1 selectively connects and releases the planetary carriers PC2, PC3. The six forward shift stages and the single reverse shift stage are performed by the engagement/disengagement of the friction elements C1, C2, B1, B2, B3, in accordance with Table 1.

Figure 3:
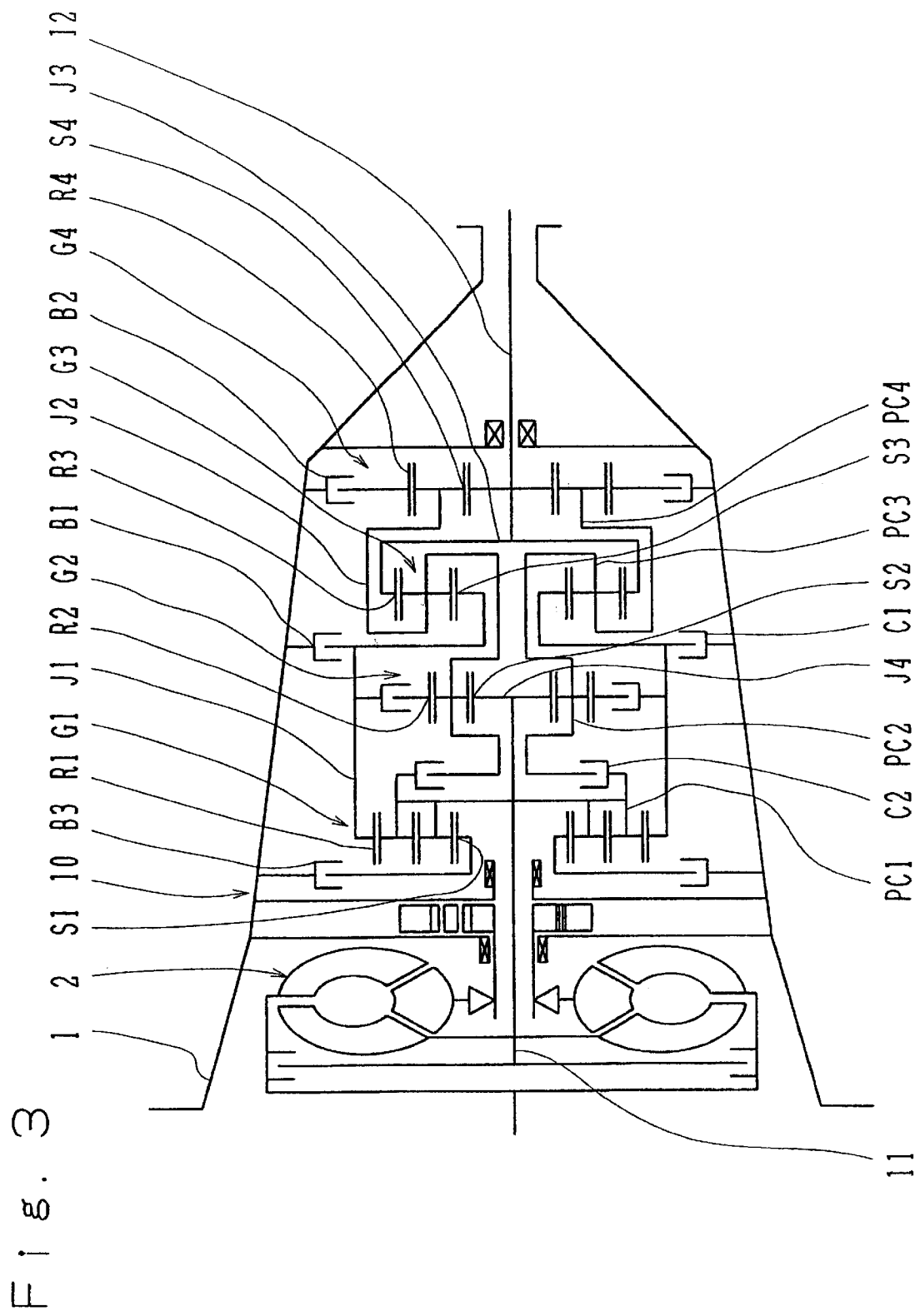
FIG. 3 is a schematic illustration of the planetary gear train of the automatic transmission according to a third embodiment of the present invention.

Referring to FIG. 3, the automatic transmission 10 according to a third embodiment is functionally and structurally the same as the automatic transmission 10 according to the first embodiment, except that the carrier PC1 is designed to be constantly connected to the input shaft 11 and the brake B3 selectively holds the sun gear S1 against rotation and releases the sun gear S1. The six forward shift stages and the single reverse shift stage are performed by the engagement/disengagement of the friction elements C1, C2, B1, B2, B3 in accordance with Table 1.

Figure 4:
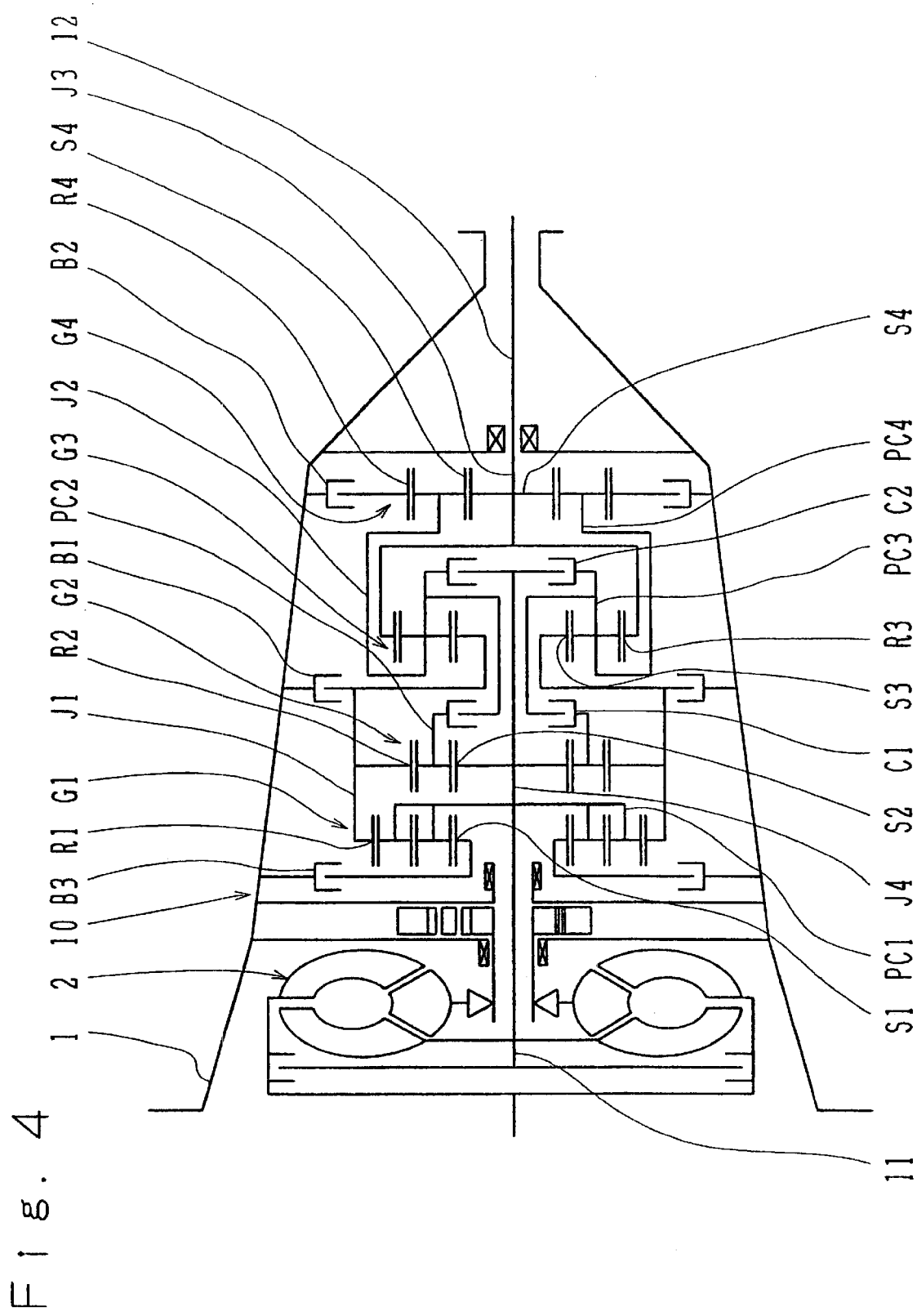
FIG. 4 is a schematic illustration of the planetary gear train of the automatic transmission according to a fourth embodiment of the present invention.

Referring to FIG. 4, the automatic transmission 10 according to a fourth embodiment is functionally and structurally the same as the automatic transmission 10 according to the first embodiment, except that the carrier PC1 is designed to be constantly connected to the input shaft 11, the clutch C1 selectively connects and releases the planetary carriers PC2, PC3, and the brake B3 selectively holds the sun gear S1 against rotation and releases the sun gear S1. The six forward shift stages and the single reverse shift stage are performed by the engagement/disengagement of the friction elements C1, C2, B1, B2, B3 in accordance with Table 1.

Figure 5:
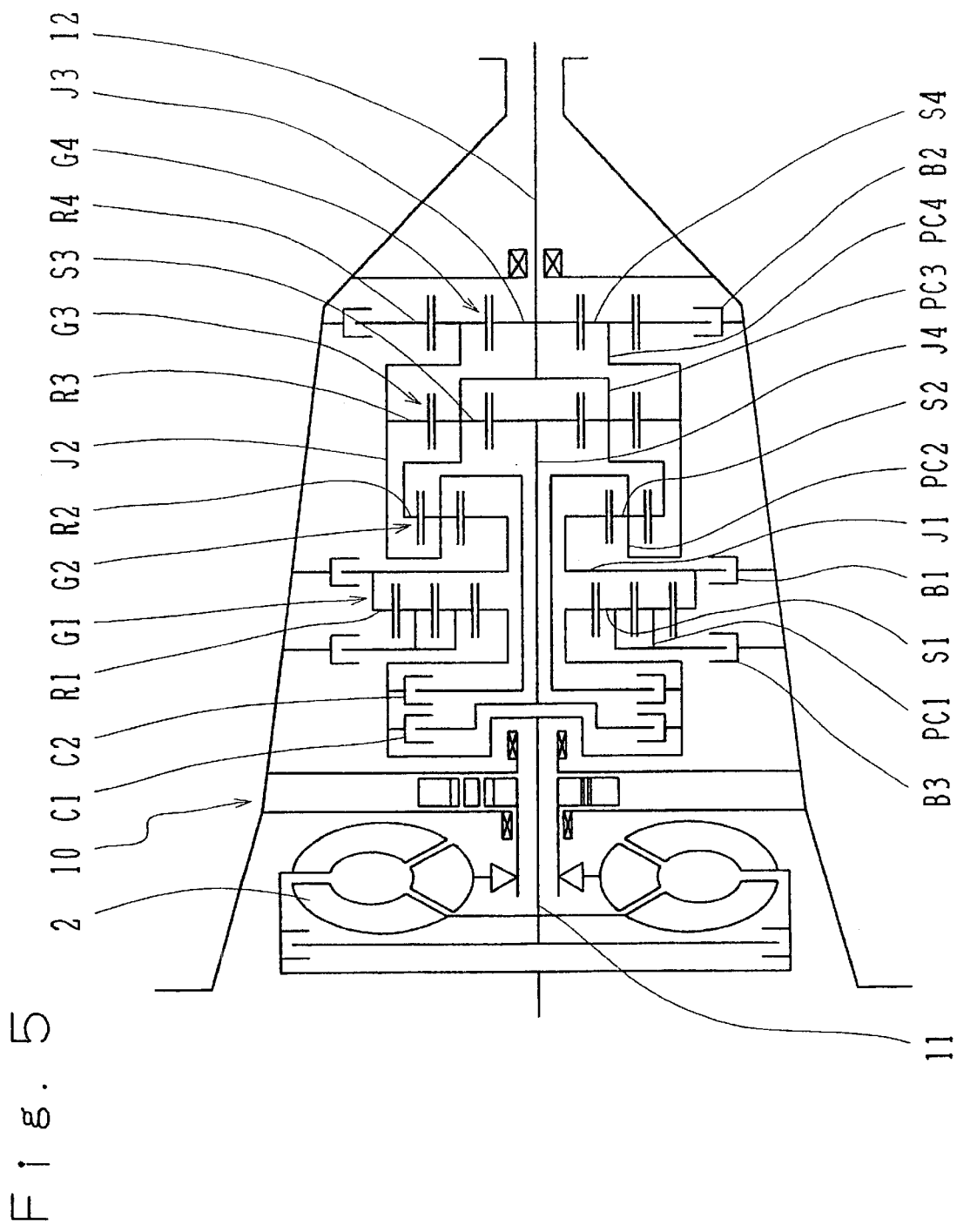
FIG. 5 is a schematic illustration of the planetary gear train of the automatic transmission according to a fifth embodiment of the present invention.

An automatic transmission 10 according to a fifth embodiment of the present invention is illustrated in FIG. 5. The respective components in this fifth embodiment that are the same as those described above with reference to the schematic illustration in FIG. 1 are denoted in FIG. 5 by the same reference numerals as those in the embodiment depicted in FIG. 1. The planetary gear train according to the fifth embodiment shown in FIG. 5 includes first, second, third, and fourth planetary gear sets G1, G2, G3, G4. The first gear set G1 includes the sun gear S1, the ring gear R1, and plural pairs of pinion gears. The sun gear S1 is designed to be constantly connected to the input shaft 11. The first pinion gear of the respective pairs of pinion gears is designed to be constantly meshed with the sun gear S1. The second pinion gear of the respective pairs of pinion gears is designed to be constantly meshed with the ring gear R1 and the first pinion gear. The gear sets G2, G3, G4 include the sun gears S2, S3, S4, the ring gears R2, R3, R4, and the plural single pinion gears.

The ring gear R1 and the sun gear S2 are rotatably connected by the rotational element J1. The planetary carriers PC2, PC4, and the ring gear R3 are rotatably connected by the rotational element J2. The ring gear R2, the planetary carrier PC3, and the sun gear S4 are rotatably connected to the output shaft 12 by the rotational element J3. The sun gear S3 is rotatably connected to the rotational element J4. The clutch C1 selectively connects and releases the input shaft 11 and the rotational element J4 while the clutch C2 selectively connects and releases the input shaft 11 and the rotational element J2. The brake B1 selectively holds the rotational element J1 against rotation and releases the rotational element J1, the brake B2 selectively holds the ring gear R4 against rotation and releases the ring gear R4, and the brake B3 selectively holds the planetary carrier PC1 against rotation and releases the planetary carrier PC1. The engaging/disengaging operations of the friction elements C1, C2, B1, B2, B3 are respectively actuated in accordance with hydraulic pressure supplied to the friction elements.

The gear ratio p in each planetary gear set G1, G2, G3, G4 is obtained in accordance with the following equations.

The gear ratio p 1 of the first planetary gear set G1:

p 1=the number of teeth of the sun gear S1/the number of teeth of the ring gear R1=0.444.

The gear ratio p 2 of the second planetary gear set G2:

p 2=the number of teeth of the sun gear S2/the number of teeth of the ring gear R2=0.46.

The gear ratio p 3 of the third planetary gear set G3:

p 3=the number of teeth of the sun gear S3/the number of teeth of the ring gear R3=0.26.

The gear ratio p 4 of the third planetary gear set G4:

p 4=the number of teeth of the sun gear S4/the number of teeth of the ring gear R4=0.3076.

Thus, the six forward shift stages and the single reverse shift stage are performed by the engagement/disengagement of the friction elements C1, C2, B1, B2, B3 in accordance with Table 2 below.

TABLE 2

| Shift Stage | C1 | C2 | B1 | B2 | B3 | Gear Ratio P1 = 0.444 P2 = 0.46 P3 = 0.26 P = 0.3076 |
|---|---|---|---|---|---|---|
| 1st | ○ | | | ○ | | 3.91 |
| 2nd | ○ | | ○ | | | 2.212 |
| 3rd | ○ | | | | ○ | 1.438 |
| 4th | ○ | ○ | | | | 1.000 |
| 5th | | ○ | | | ○ | 0.796 |
| 6th | | ○ | ○ | | | 0.685 |
| Rev. | | | | ○ | ○ | 3.211 |

Figure 6:
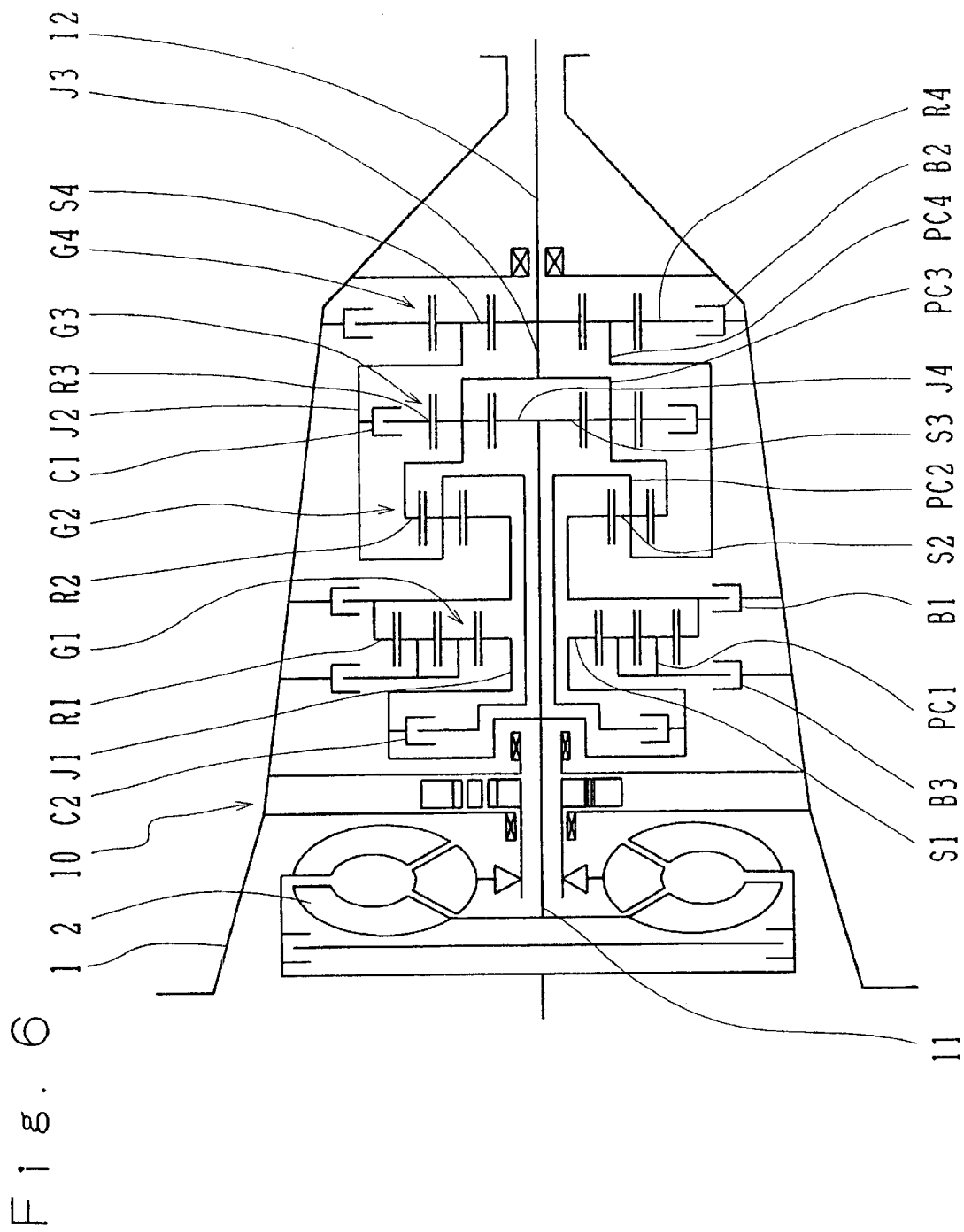
FIG. 6 is a schematic illustration of the planetary gear train of the automatic transmission according to a sixth embodiment of the present invention.

Referring to FIG. 6, the automatic transmission 10 according to a sixth embodiment is functionally and structurally the same as the automatic transmission 10 according to the fifth embodiment shown in FIG. 5, except that the clutch C1 selectively connects and releases the planetary carrier PC2 and the ring gear R3, and the sun gear S3 and the input shaft 11 are rotatably connected by the rotational element J4. The six forward shift stages and the single reverse shift stage are thus performed by the engagement/disengagement of the friction elements C1, C2, B1, B2, B3 in accordance with Table 2.

Figure 7:
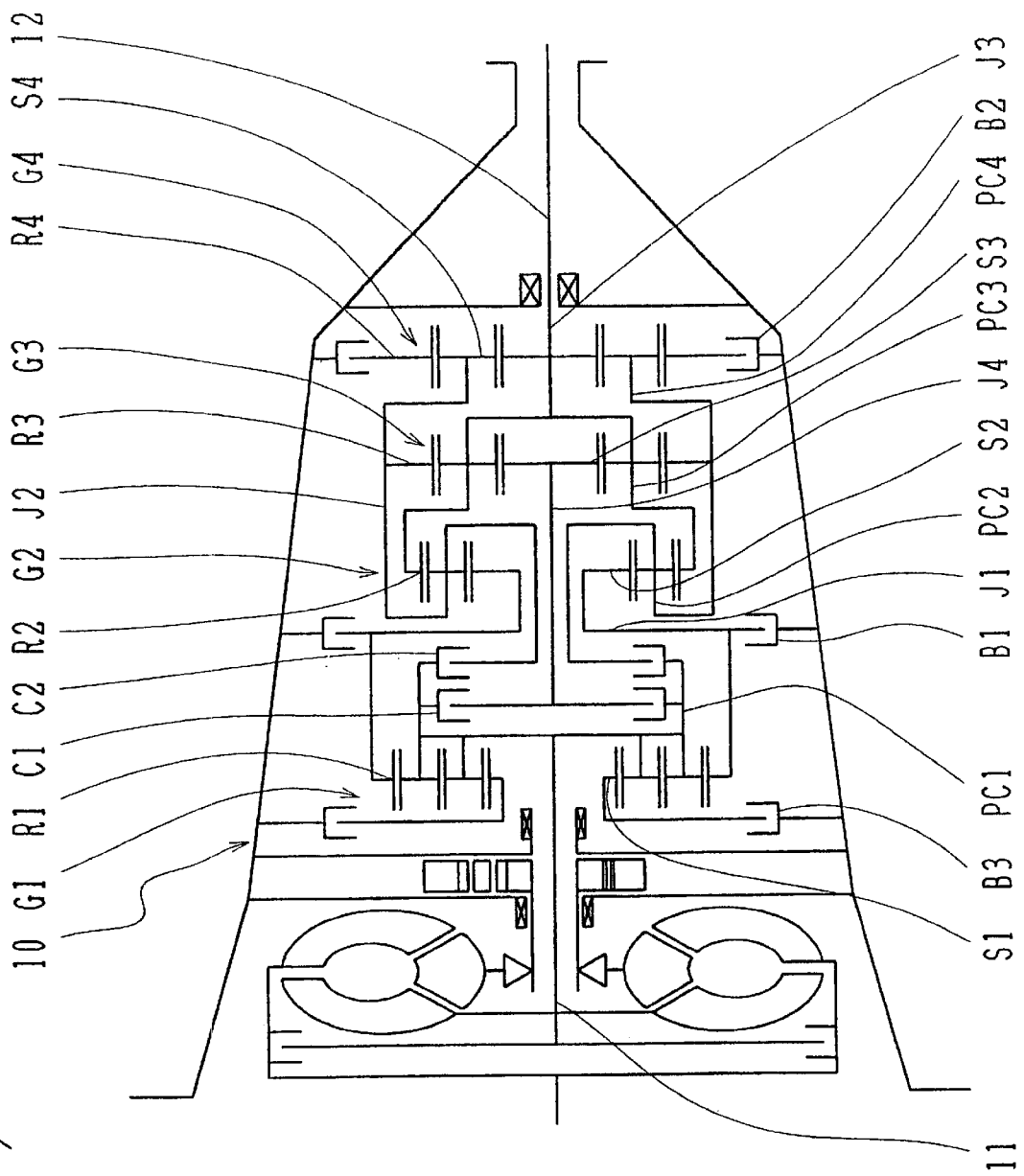
FIG. 7 is a schematic illustration of the planetary gear train of the automatic transmission according to a seventh embodiment of the present invention.

Referring to FIG. 7, the automatic transmission 10 according to a seventh embodiment is functionally and structurally the same as the automatic transmission 10 according to the fifth embodiment, except that the carrier PC1 is designed to be constantly connected to the input shaft 11, and the brake B3 selectively holds the sun gear S1 against rotation and releases the sun gear S1. The six forward shift stages and the single reverse shift stage are thus performed by the engagement/disengagement of the friction elements C1, C2, B1, B2, B3 in accordance with Table 2.

Figure 8:
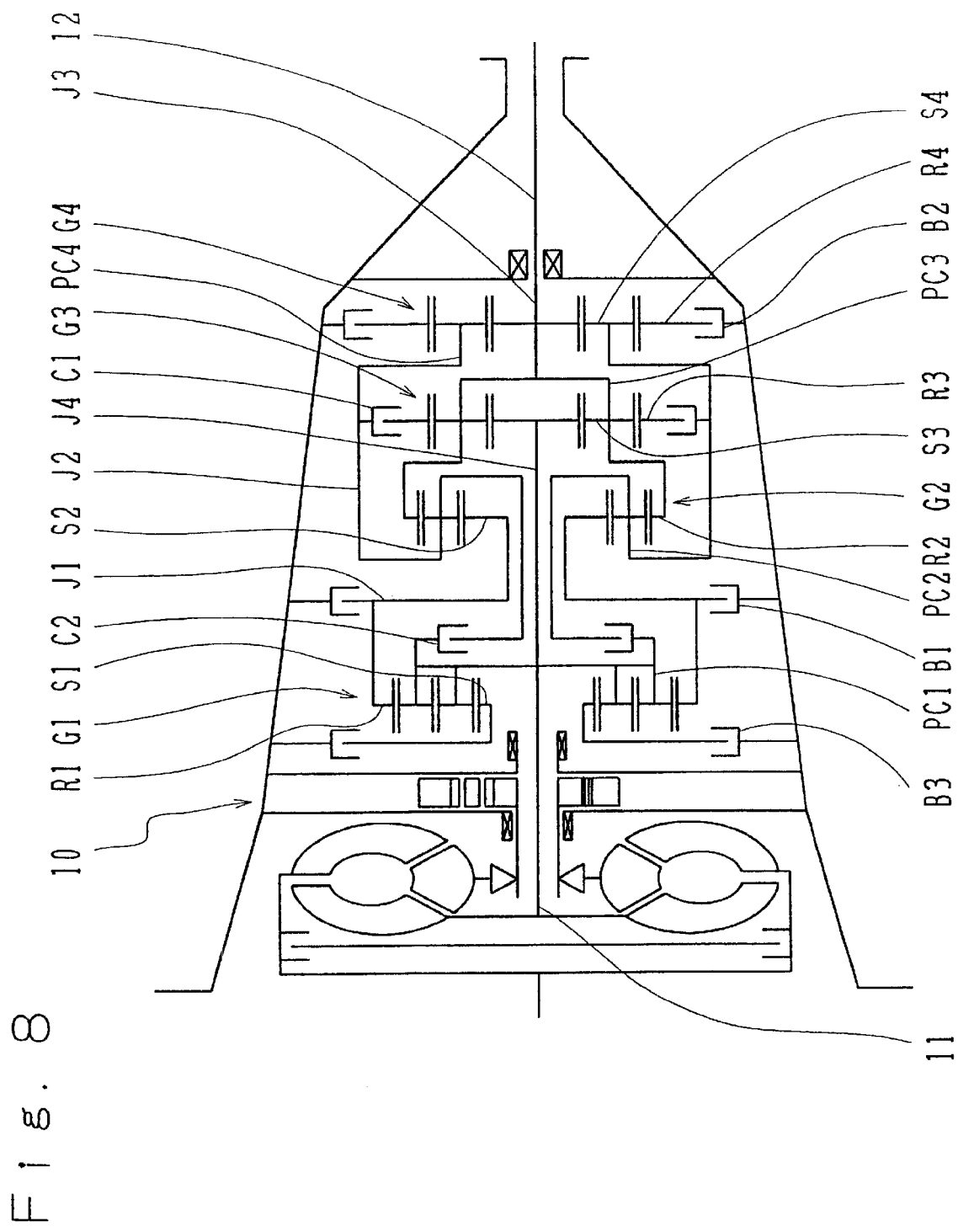
FIG. 8 is a schematic illustration of the planetary gear train of the automatic transmission according to a eighth embodiment of the present invention.

Referring to FIG. 8, the automatic transmission 10 according to an eighth embodiment is functionally and structurally the same as the automatic transmission 10 according to the fifth embodiment, except that the carrier PC1 is designed to be constantly connected to the input shaft 11, the clutch C1 selectively connects and releases the carrier PC2 and the ring gear R3, the sun gear S3 is rotatably connected to the input shaft 11 by the rotational element J4, and the brake B3 selectively holds the sun gear S1 against rotation and releases the sun gear S1. The six forward shift stages and the single reverse shift stage are thus performed by the engagement/disengagement of the friction elements C1, C2, B1, B2, B3, in accordance with Table 2.

Figure 9:
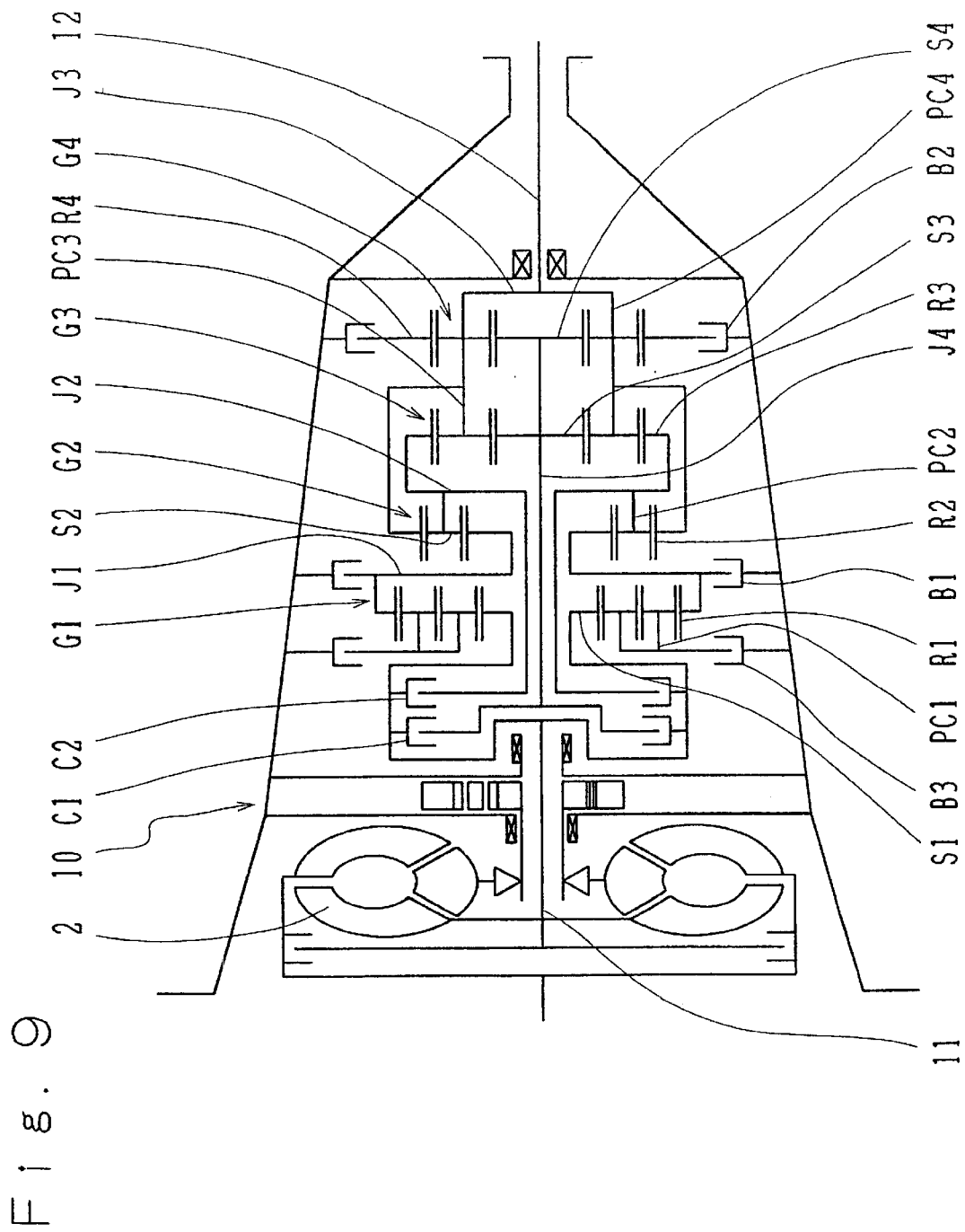
FIG. 9 is a schematic illustration of the planetary gear train of the automatic transmission according to a ninth embodiment of the present invention.

Referring to FIG. 9, the automatic transmission 10 according to a ninth embodiment is functionally and structurally the same as the automatic transmission 10 according to the fifth embodiment, except that the planetary carrier PC2 and the ring gear R3 are rotatably connected by the rotational element J2, the ring gear R2 and the carriers PC3, PC4 are rotatably connected to the output shaft 12 by the rotational element J3, and the sun gears S3, S4 are rotatably connected by the rotational element J4. The six forward shift stages and the single reverse shift stage are thus performed by the engagement/disengagement of the friction elements C1, C2, B1, B2, B3 according to Table 2.

Figure 10:
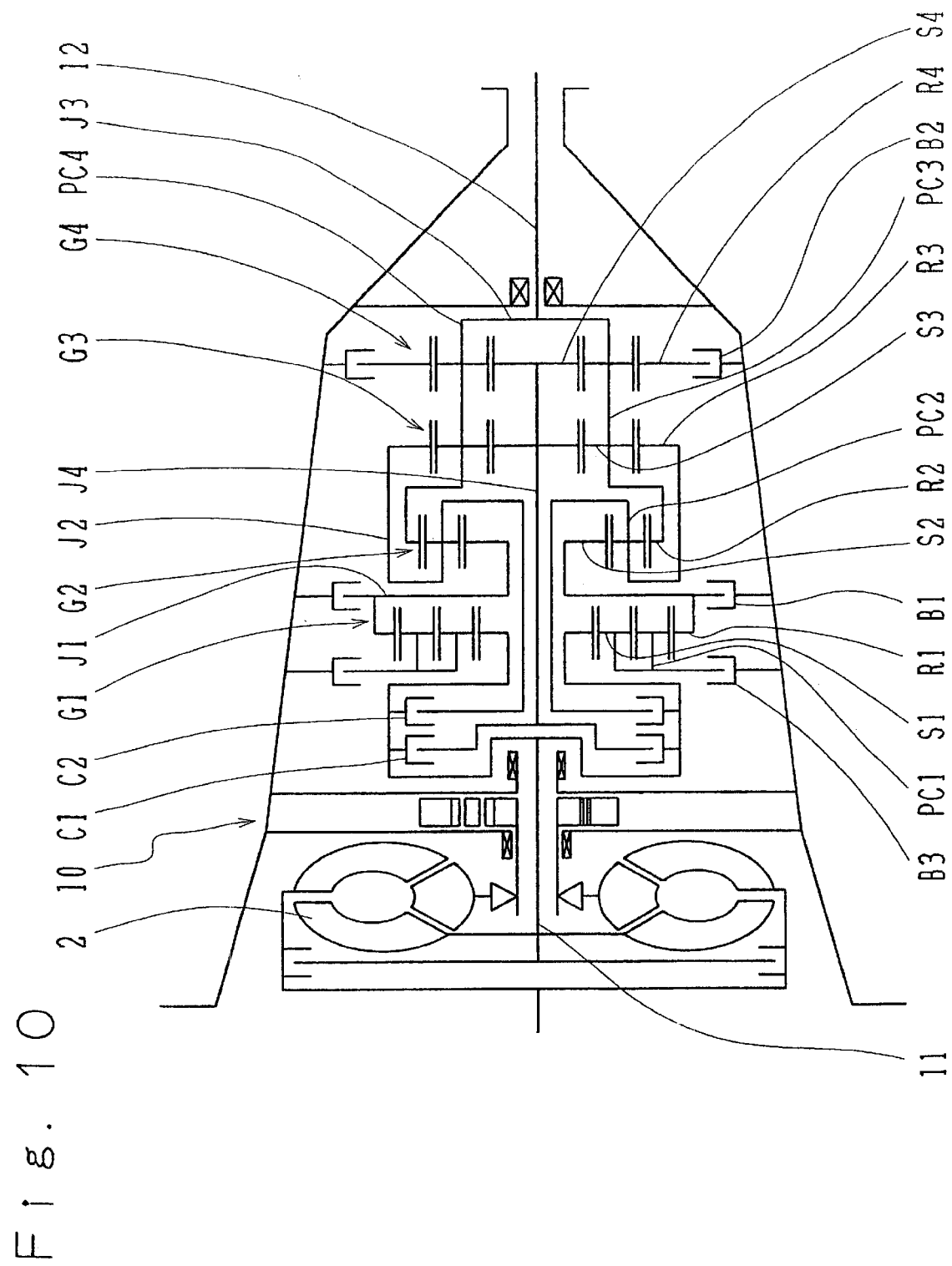
FIG. 10 is a schematic illustration of a modified mode of the planetary gear train of the automatic transmission shown in FIG. 9.

The planetary gear train provided in the automatic transmission 10 shown in FIG. 10 is a modified mode of the automatic transmission 10 according to the ninth embodiment. In this modified mode, the ring gear R2 of the gear set G2 is connected to the carrier PC3 of the gear set G3 between the gear set G2 and the gear set G3 in the axial direction. Further, the carrier PC2 of the gear set G2 is connected to the ring gear R3 of the gear set G3 through the radially outer side of the ring gear R2 of the gear set G2.

Figure 11:
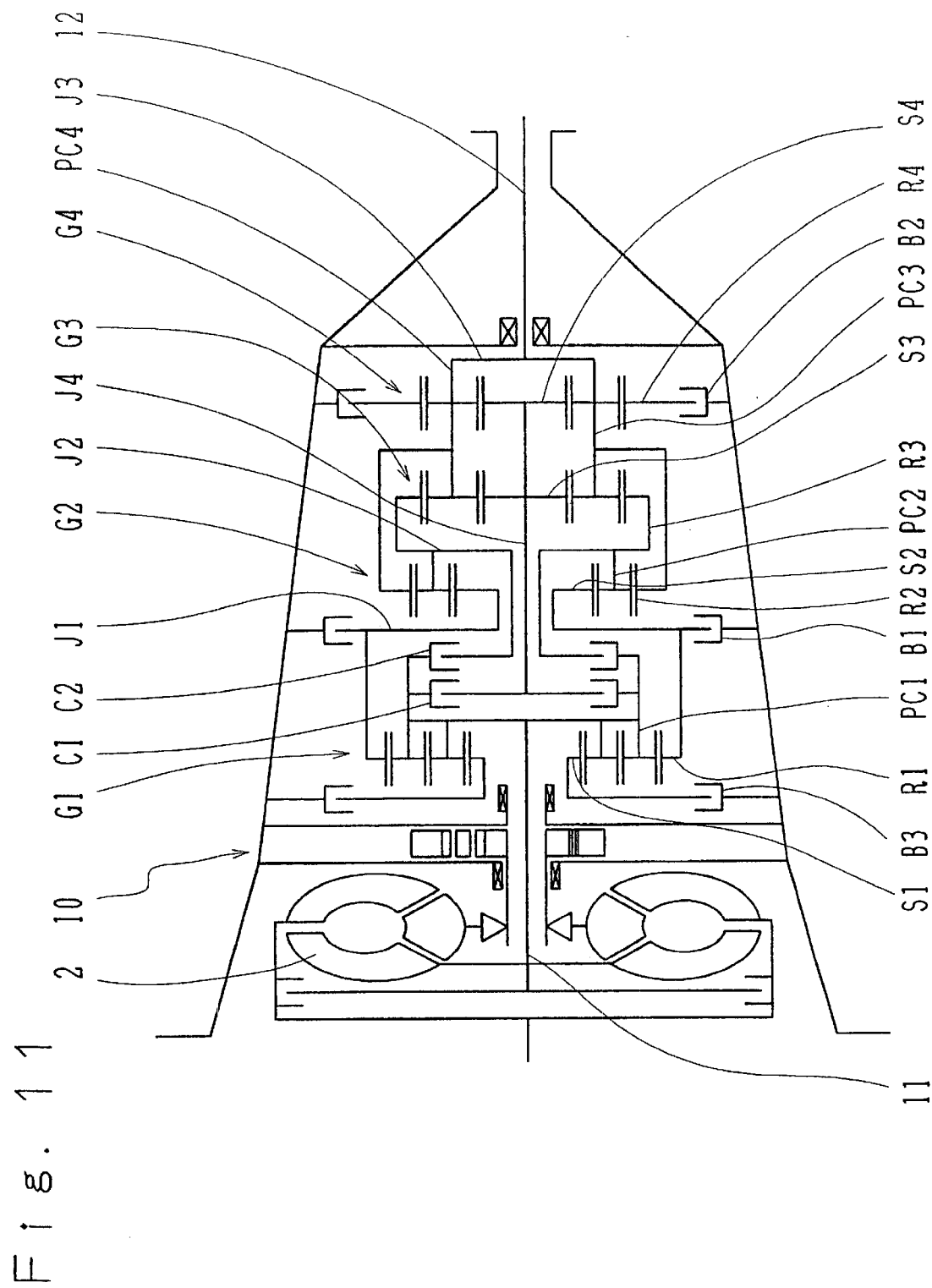
FIG. 11 is a schematic illustration of the planetary gear train of the automatic transmission according to a tenth embodiment of the present invention.

Referring to FIG. 11, the automatic transmission 10 according to a tenth embodiment is functionally and structurally the same as the automatic transmission 10 according to the ninth embodiment shown in FIG. 9, except that the carrier PC1 is designed to be constantly connected to the input shaft 11, the ring gear R2 and the carriers PC3, PC4 are rotatably connected to the output shaft 12 by the rotational element J3, the sun gear S4 is rotatably connected to the rotational element J4, the planetary carrier PC2 and the ring gear R3 are rotatably connected by the rotational element J2, and the brake B3 selectively holds the sun gear S1 against rotation and releases the sun gear S1. The six forward shift stages and the single reverse shift stage are thus performed by the engagement/disengagement of the friction elements C1, C2, B1, B2, B3, in accordance with Table 2.

Figure 12:
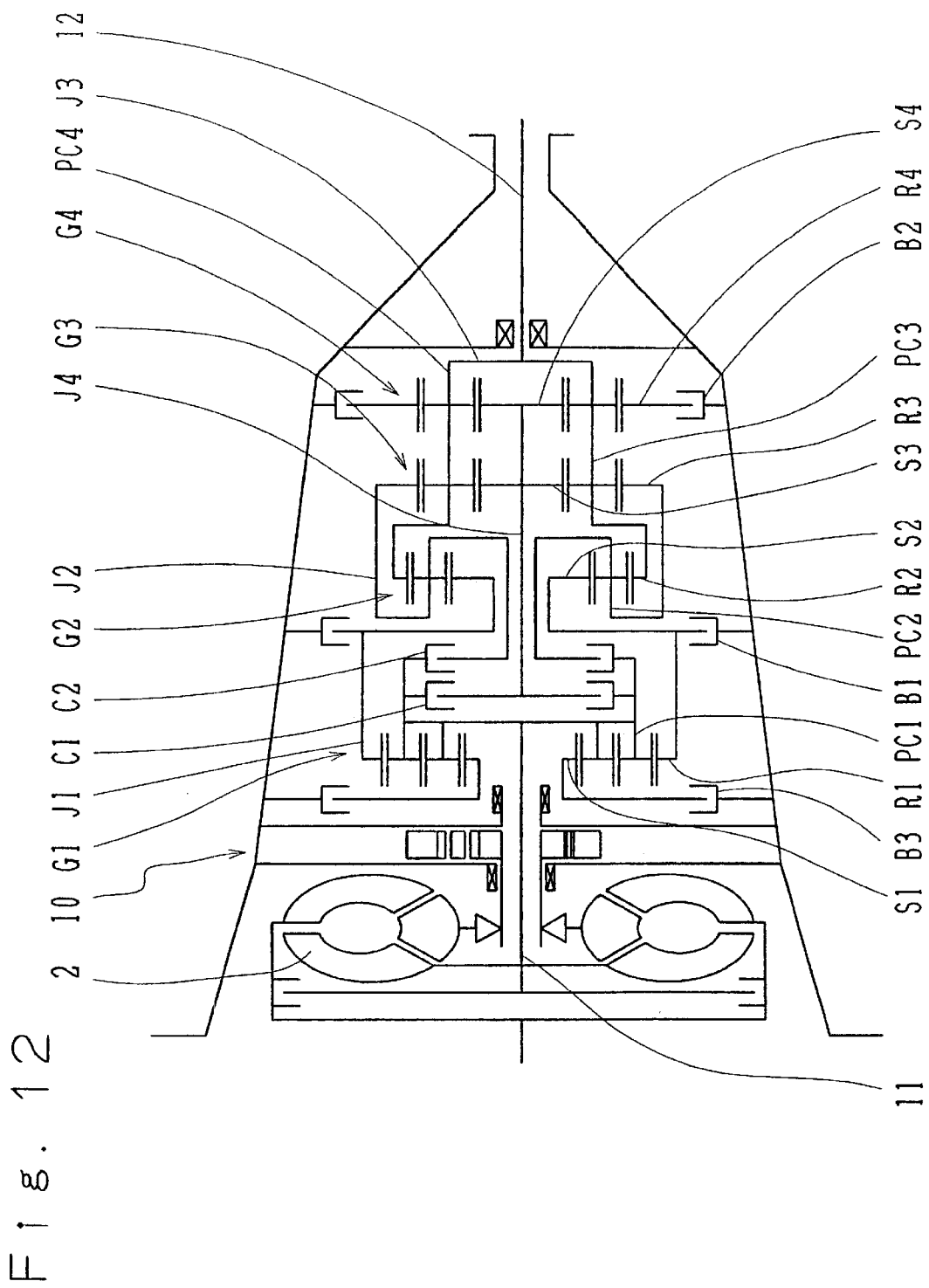
FIG. 12 is a schematic illustration of a modified mode of the planetary gear train of the automatic transmission shown in FIG. 11.

The planetary gear train provided in the automatic transmission 10 shown in FIG. 12 is a modified mode of the automatic transmission 10 according to the tenth embodiment. In this modified mode, the ring gear R2 of the gear set G2 is connected to the carrier PC3 of the gear set G3 between the gear set G2 and the gear set G3 in the axial direction. Further, the carrier PC2 of the gear set G2 is connected to the ring gear R3 of the gear set G3 through the radially outer side of the ring gear R2 of the gear set G2.

Figure 13:
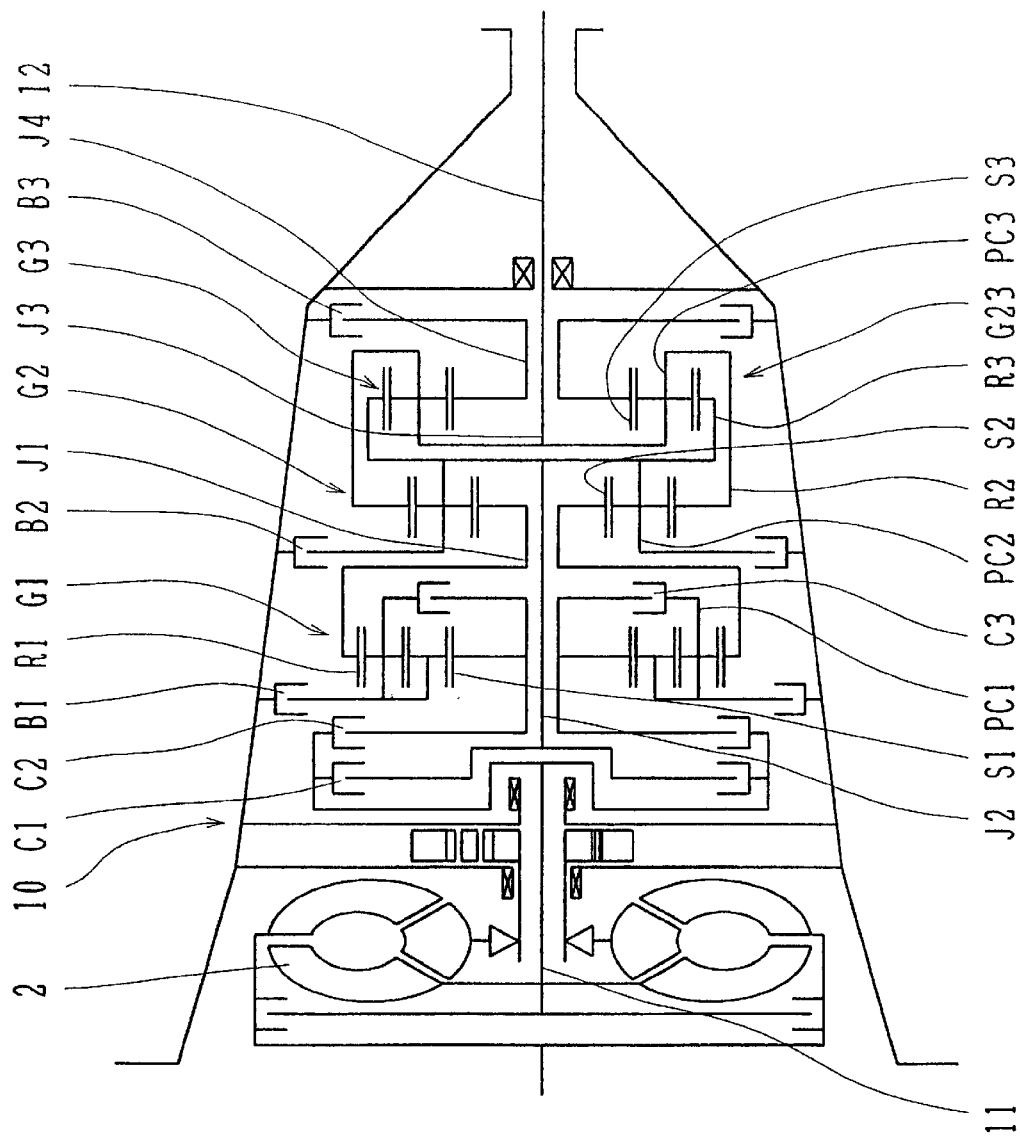
FIG. 13 is a schematic illustration of the planetary gear train of the automatic transmission according to an eleventh embodiment of the present invention.

An automatic transmission 10 according to a still further embodiment of the present invention is illustrated in FIG. 13. The respective components in this embodiment that are the same as those described above with reference to the schematic illustration in FIG. 1 are denoted in FIG. 13 by the same reference numerals as those in the embodiment depicted in FIG. 1. The planetary gear train according to the eleventh embodiment shown in FIG. 13 includes the first planetary gear set G1, the second planetary gear set G2, and the third planetary gear set G3. The first gear set G1 includes the sun gear S1, the ring gear R1, and plural pairs of pinion gears. The first pinion gear of the respective pairs of pinion gears is designed to be constantly meshed with the sun gear S1. The second pinion gear of the respective pairs of pinion gears is designed to be constantly meshed with the ring gear R1 and the first pinion gear. The gear sets G2, G3, respectively include the sun gears S2, S3, the ring gears R2, R3, and the plural single pinion gears. The respective pinion gear of each gear set G2, G3 is designed to be constantly meshed with each sun gear S2, S3 and each ring gear R2, R3.

The automatic transmission 10 further includes the first rotational element J1, the second rotational element J2, the third rotational element J3, and the fourth rotational element J4. The rotational element J1 is rotatably connected to the ring gear R1. The rotational element J3 is rotatably connected to the output shaft 12. The planetary gear set G2 is rotatably connected to the planetary gear set G3 by the rotational element J1. A planetary gear unit G23 represents a unit including the planetary gear sets G2, G3 and the rotational elements J1, J2, J3, J4.

The planetary gear unit G23 rotatably connects the planetary carrier PC2 and the ring gear R3. The planetary gear unit G23 further connects the ring gear R2 and a planetary carrier PC3. In addition, the rotational element J1 is connected to the sun gear S2, the rotational element J2 is connected to the planetary carrier PC2, the rotational element J3 is connected to the planetary carrier PC3, and the rotational element J4 is connected to the sun gear S3.

The automatic transmission 20 still further includes a first friction clutch C1, a second friction clutch C2, a third friction clutch C3, a first friction brake B1, a second friction brake B2, and a third friction brake B3. The clutch C1 selectively connects and releases the input shaft 11 and the rotational element J2. The clutch C2 selectively connects and releases the input shaft 11 and the sun gear S1 while the clutch C3 selectively connects and releases the sun gear S1 and the planetary carrier PC1. The brake B1 selectively holds the planetary carrier PC1 against rotation and releases the planetary carrier PC1, the brake B2 selectively holds the rotational element J2 against rotation and releases the rotational element J2, and the brake B3 selectively holds the rotational element J4 against rotation and releases the rotational element J4. The engaging and disengaging operations of the friction elements C1, C2, C3, B1, B2, B3 are respectively actuated in accordance with hydraulic pressure supplied to the friction elements.

The gear ratio p in each planetary gear set G1, G2, G3 is obtained in accordance with the following equations.

The gear ratio p 1 of the first planetary gear set G1:
p 1=the number of teeth of the sun gear S1/the number of teeth of the ring gear R1=0.55.

The gear ratio p 2 of the second planetary gear set G2:
p 2=the number of teeth of the sun gear S2/the number of teeth of the ring gear R2=0.53.

The gear ratio p 3 of the third planetary gear set G3:
p 3=the number of teeth of the sun gear S3/the number of teeth of the ring gear R3=0.4.

According to the Table 3 below, a circle "○" identifies an engaged friction clutch or an engaged friction brake. A blank in Table 3 shows a disengaged condition of each friction element.

TABLE 3

| Shift Stage | C1 | C2 | C3 | B1 | B2 | B3 | Gear Ratio |
|---|---|---|---|---|---|---|---|
| 1st | | ○ | | ○ | | ○ | 3.918 |
| 2nd | | ○ | ○ | | | ○ | 2.155 |
| 3rd | ○ | | ○ | | | ○ | 1.400 |
| 4th | ○ | ○ | ○ | | | | 1.000 |
| 5th | ○ | ○ | | ○ | | | 0.807 |
| 6th | ○ | | | ○ | ○ | | 0.654 |
| Rev. 1st | | ○ | | | ○ | ○ | 3.431 |
| Rev. 2nd | | ○ | ○ | | ○ | | 1.887 |

A switching operation in each shift stage is described with reference to Table 3. The shift operation for a first shift stage is established in the following manner. The brake B1 selectively holds the carrier PC1 so as not to rotate the carrier PC1. The engagement of the second clutch C2 transmits driving torque of the input shaft 11 to the ring gear R1, wherein the driving torque is increased corresponding to the rotation of the ring gear R1. The increased torque is transmitted to the rotational element J1. The brake B3 holds the rotational element J4 so as not to rotate the rotational element J4. Therefore, the rotational element J3 is rotated, decreasing the rotational speed. The first shift stage is thus performed.

The shift operation of a second shift stage is established in the following manner. The driving torque from the input shaft 11 is transmitted to the sun gear S1 by the engagement of the clutch C2. The planetary gear set G1 is rotated as a unit by the engagement of the clutch C3. At this stage, the driving torque from the input shaft 11 is transmitted to the rotational element J1. The brake B3 holds the rotational element J4 so as not to rotate the rotational element J4. Therefore, the rotational element J3 is rotated, decreasing the rotational speed so that the second shift stage is performed.

The shift operation of a third shift stage is established in the following manner. The driving torque from the input shaft 11 is transmitted to the second rotational element J2 by the engagement of the clutch C1. The brake B3 holds the rotational element J4 so as not to rotate the rotational element J4. The rotational element J3 is thus rotated, decreasing the rotational speed and so the third shift stage is performed.

The shift operation of a fourth shift stage is established in the following manner. The driving torque from the input shaft 11 is transmitted to the sun gear S1 by the engagement of the clutch C2. The planetary gear set G1 is rotated as a unit by the engagement of the clutch C3. At the stage, the driving torque from the input shaft 11 is transmitted to the rotational element J1. Meanwhile, The driving torque from the input shaft 11 is transmitted to the rotational element J2 by the engagement of the clutch C1. Therefore, the planetary gear sets G2, G3 are rotated as a unit, wherein the fourth shift stage is established.

The shift operation of a fifth shift stage is established as follows. The driving torque of the input shaft 11 is transmitted to the rotational element J2 by the engagement of the clutch C1. The driving torque of the input shaft 11 is transmitted to the sun gear S1 by the engagement of the clutch C2. The brake B1 holds the planetary carrier PC1 so as not to rotate the planetary carrier PC1. Accordingly, the driving torque of the input shaft 11 is increased via the ring gear R1. The driving torque increased by the rotation of the ring gear R1 is transmitted to the first rotational element J1. Therefore, the rotational element J3 is rotated, increasing the rotational speed, so that the fifth shift stage is established.

The shift operation of a sixth shift stage is established in the following manner. The driving torque from the input shaft 11 is transmitted to the rotational element J2 by the engagement of the clutch C1. The planetary gear set G1 is rotated as a unit by the engagement of the clutch C3. The brake B1 holds the planetary carrier PC1 so as not to rotate the planetary carrier PC1 and the rotational element J1. Consequently, the rotational element J3 is rotated, increasing the rotational speed, wherein the sixth shift stage is performed.

The shift operation of a reverse first shift stage is established as follows. The driving torque from the input shaft 11 is transmitted to the sun gear S1 by the engagement of the clutch C2. The brake B1 holds the planetary carrier PC1 so as not to rotate the planetary carrier PC1. Accordingly, the driving torque from the input shaft 11 is increased via the ring gear R1. The driving torque increased by the rotation of the ring gear R1 is transmitted to the rotational element J1. The brake B2 holds the rotational element J2 so as not to rotate the rotational element J2. Therefore, the rotational element J3 is rotated in a reverse manner, wherein the reverse first shift stage is performed.

The shift operation of a reverse second shift stage is established as follows. The driving torque from the input shaft 11 is transmitted to the sun gear S1 by the engagement of the clutch C2. The planetary gear set G1 is rotated as a unit by the engagement of the clutch C3. Therefore, the driving torque from the input shaft 11 is transmitted to the rotational element J1. The brake B2 holds the rotational element J2 so as not to rotate the rotational element J2. Therefore, the rotational element J3 is rotated in the reverse way so that the reverse second shift stage is performed.

Figure 14:
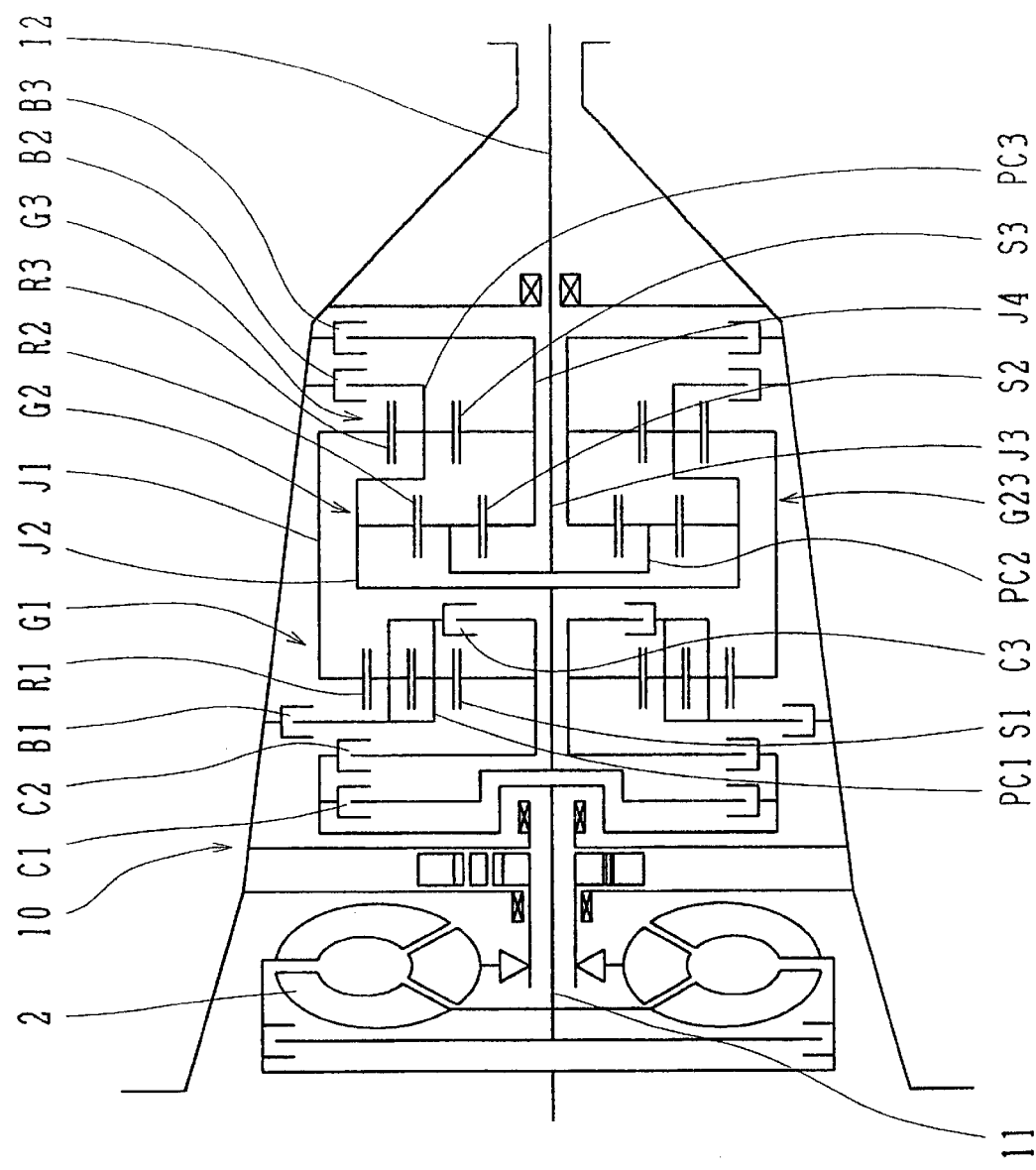
FIG. 14 is a schematic illustration of the planetary gear train of the automatic transmission according to a twelfth embodiment of the present invention.

The automatic transmission 10 according to a twelfth embodiment of the present invention shown in FIG. 14 is functionally the same as the automatic transmission 10 according to the eleventh embodiment, although the planetary gear unit G23 according to the twelfth embodiment is structurally different from that according to the eleventh embodiment. The planetary gear unit G23 according to the twelfth embodiment rotatably connects the ring gear R2 and the planetary carrier PC3. The planetary gear unit G23 further connects the sun gears S2 and S3. The rotational element J1 is rotatably connected to the ring gear R3, the rotational element J2 is rotatably connected to the ring gear R2, the rotational element J3 is rotatably connected to the planetary carrier PC2, and the rotational element J4 is rotatably connected to sun gear S3.

Figure 15:
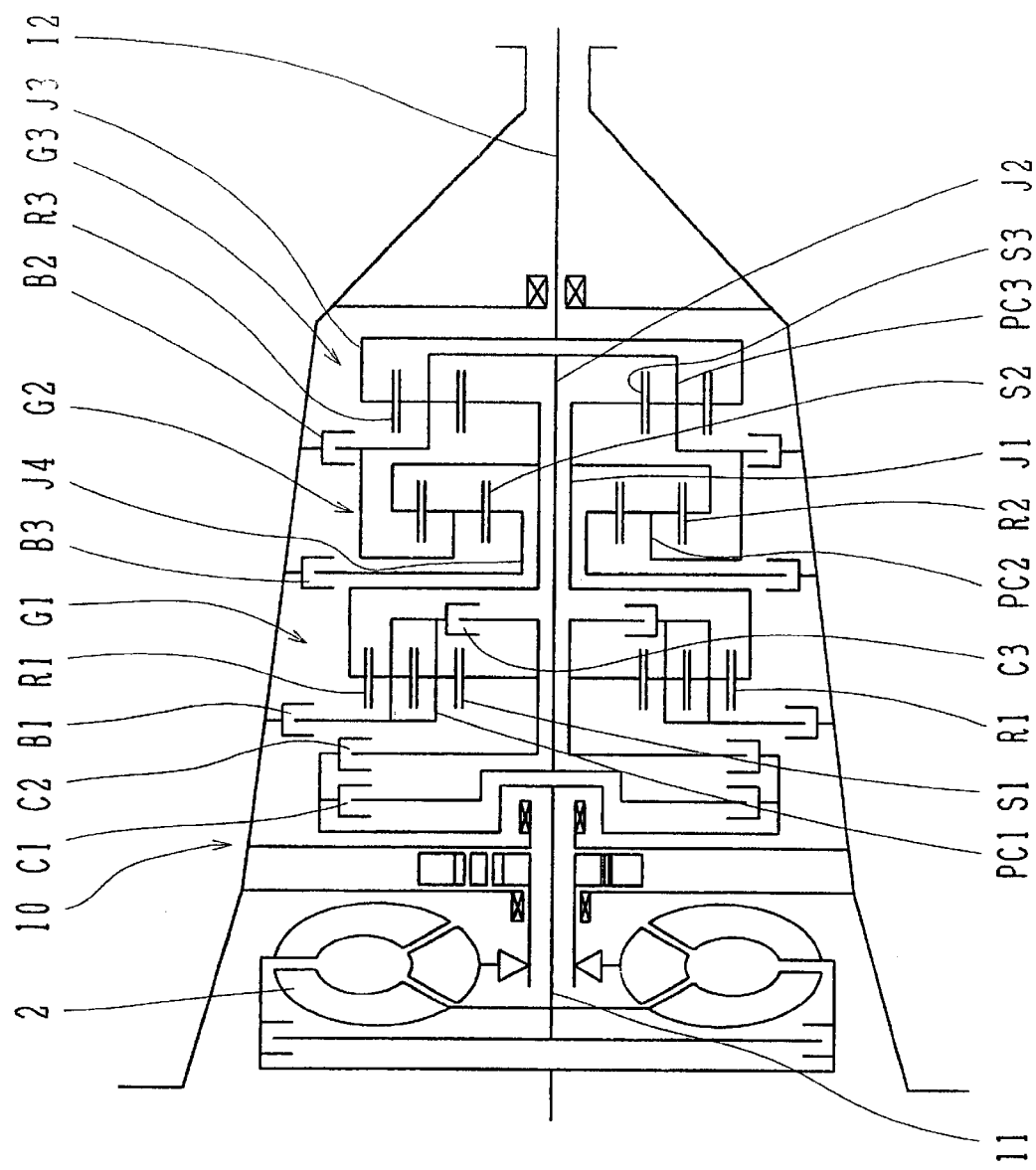
FIG. 15 is a schematic illustration of the planetary gear train of the automatic transmission according to a thirteenth embodiment of the present invention.

The automatic transmission 10 according to a thirteenth embodiment of the present invention shown in FIG. 15 is functionally the same as the automatic transmission 10 according to the eleventh embodiment, although the planetary gear unit G23 according to the thirteenth embodiment is structurally different from that according to the eleventh embodiment. The planetary gear unit G23 shown in FIG. 15 rotatably connects the planetary carriers PC2, PC3. The planetary gear unit G23 further rotatably connects the ring gear R2 and the sun gear S3. In addition, the rotational element J1 is rotatably connected to the ring gear R2, the rotational element J2 is rotatably connected to the planetary carrier PC2, the rotational element J3 is rotatably connected to the ring gear R3, and the rotational element J4 is rotatably connected to the sun gear S2.

The planetary gear unit G23 according to each of the eleventh, twelfth, and thirteenth embodiments includes something in common structurally and functionally as described in the following. Each planetary gear unit G23 connects the planetary gear sets G2, G3. Each planetary gear unit G23 includes the rotational element J1 connected to the ring gear R1, the rotational element J2, the rotational element J3 connected to the output shaft 12, and the fourth rotational element J4.

The principles, various embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. An automatic transmission for a vehicle, comprising:

an input shaft connected to an output shaft of an engine;

an output shaft connected to an axle shaft via a differential gear;

a torque converter for transmitting driving torque from the engine to the automatic transmission;

a planetary gear system comprising first, second, third and fourth planetary gear sets, the first gear set having a first sun gear, a first ring gear, a pair of first pinion gears meshing with the first sun gear and the first ring gear, and a first planetary carrier rotatably supporting the first pinion gears, the first sun gear being connected to the input shaft, the second, third and fourth gear sets respectively having second, third and fourth sun gears, second, third and fourth ring gears, second, third and fourth single pinion gears meshing with each sun gear and ring gear, and second, third and fourth planetary carriers rotatably supporting the second, third, and fourth pinion gears;

a first rotational element rotatably connecting the first and second ring gears and the third sun gear;

a second rotational element rotatably connecting the second, third and fourth planetary carriers;

a third rotational element rotatably connecting the third ring gear, the fourth sun gear, and the output shaft;

a fourth rotational element rotatably connecting the second sun gear and the input shaft;

a first clutch selectively connecting and releasing the second ring gear and the third sun gear;

a second clutch selectively connecting and releasing the second rotational element and the input shaft;

a first brake selectively holding the first rotational element against rotation and releasing the first rotational element;

a second brake selectively holding the fourth ring gear against rotation and releasing the fourth ring gear; and a third brake selectively holding the first planetary carrier against rotation and releasing the first planetary carrier.

2. An automatic transmission for a vehicle, comprising:

an input shaft connected to an output shaft of an engine;

an output shaft connected to an axle shaft via a differential gear;

a torque converter for transmitting driving torque from the engine to the automatic transmission;

a planetary gear system comprising first, second, third and fourth planetary gear sets, the first gear set having a first sun gear, a first ring gear, a pair of first pinion gears meshing with the first sun gear and the first ring gear, and a first planetary carrier rotatably supporting the first pinion gears, the first sun gear being connected to the input shaft, the second, third and fourth gear sets respectively having second, third and fourth sun gears, second, third and fourth ring gears, second, third and fourth single pinion gears meshing with each sun gear and ring gear, and second, third and fourth planetary carriers rotatably supporting the second, third and fourth pinion gears;

a first rotational element rotatably connecting the first and second ring gears and the third sun gear;

a second rotational element rotatably connecting the second, third and fourth planetary carriers;

a third rotational element rotatably connecting the third ring gear, the fourth sun gear and the output shaft;

a fourth rotational element rotatably connecting the second sun gear and the input shaft;

a first clutch selectively connecting and releasing the second and third planetary carriers;

a second clutch selectively connecting and releasing the second rotational element and the input shaft;

a first brake selectively holding the first rotational element against rotation and releasing the first rotational element;

a second brake selectively holding the fourth ring gear against rotation and releasing the fourth ring gear; and a third brake selectively holding the first planetary carrier against rotation and releasing the first planetary carrier.

3. An automatic transmission for a vehicle, comprising:

an input shaft connected to an output shaft of an engine;

an output shaft connected to an axle shaft via a differential gear;

a torque converter for transmitting driving torque from the engine to the automatic transmission;

a planetary gear system comprising first, second, third and fourth planetary gear sets, the first gear set having a first sun gear, a first ring gear, a pair of first pinion gears meshing with the first sun gear and the first ring gear, and a first planetary carrier rotatably supporting the first pinion gears, the first planetary carrier being connected to the input shaft, the second, third and fourth gear sets respectively having second, third and fourth sun gears, second, third and fourth ring gears, second, third and fourth single pinion gears meshing with each sun gear and ring gear, and second, third and fourth planetary carriers rotatably supporting the second, third and fourth pinion gears;

a first rotational element rotatably connecting the first and second ring gears and the third sun gear;

a second rotational element rotatably connecting the second, third and fourth planetary carriers;

a third rotational element rotatably connecting the third ring gear, the fourth sun gear and the output shaft;

a fourth rotational element rotatably connecting the second sun gear and the input shaft;

a first clutch selectively connecting and releasing the second ring gear and the third sun gear;

a second clutch selectively connecting and releasing the second rotational element and the input shaft;

a first brake selectively holding the first rotational element against rotation and releasing the first rotational element;

a second brake selectively holding the fourth ring gear against rotation and releasing the fourth ring gear; and a third brake selectively holding the first sun gear against rotation and releasing the first sun gear.

4. An automatic transmission for a vehicle, comprising:

an input shaft connected to an output shaft of an engine;

an output shaft connected to an axle shaft via a differential gear;

a torque converter for transmitting driving torque from the engine to the automatic transmission;

a planetary gear system comprising first, second, third and fourth planetary gear sets, the first gear set having a first sun gear, a first ring gear, a pair of first pinion gears meshing with the first sun gear and the first ring gear, and a first planetary carrier rotatably supporting the first pinion gears, the first planetary carrier being connected to the input shaft, the second, third and fourth gear sets respectively having second, third and fourth sun gears, second, third and fourth ring gears, second, third and fourth single pinion gears meshing with each sun gear and ring gear, and second, third and fourth planetary carriers rotatably supporting the second, third and fourth pinion gears;

a first rotational element rotatably connecting the first and second ring gears and the third sun gear;

a second rotational element rotatably connecting the second, third, and fourth planetary carriers;

a third rotational element rotatably connecting the third ring gear, the fourth sun gear and the output shaft;

a fourth rotational element rotatably connecting the second sun gear and the input shaft;

a first clutch selectively connecting and releasing the second and third planetary carriers;

a second clutch selectively connecting and releasing the second rotational element and the input shaft;

a first brake selectively holding the first rotational element against rotation and releasing the first rotational element;

a second brake selectively holding the fourth ring gear against rotation and releasing the fourth ring gear; and a third brake selectively holding the first sun gear against rotation and releasing the first sun gear.

5. An automatic transmission for a vehicle, comprising:

an input shaft connected to an output shaft of an engine;

an output shaft connected to an axle shaft via a differential gear;

a torque converter for transmitting driving torque from the engine to the automatic transmission;

a planetary gear system comprising first, second, third and fourth planetary gear sets, the first gear set having a first sun gear, a first ring gear, a pair of first pinion gears meshing with the first sun gear and the first ring gear, and a first planetary carrier rotatably supporting the first pinion gears, the first sun gear being connected to the input shaft, the second, third and fourth gear sets respectively having second, third and fourth sun gears, second, third and fourth ring gears, second, third and fourth single pinion gears meshing with each sun gear and ring gear, and second, third and fourth planetary carriers rotatably supporting the second, third and fourth pinion gears;

a first rotational element rotatably connecting the first ring gear and the second sun gear;

a second rotational element rotatably connecting the second and fourth planetary carriers, and the third ring gear;

a third rotational element rotatably connecting the second ring gear, the third planetary carrier and the fourth sun gear to the output shaft;

a fourth rotational element rotatably connected to the third sun gear;

a first clutch selectively connecting and releasing the fourth rotational element and the input shaft;

a second clutch selectively connecting and releasing the second rotational element and the input shaft;

a first brake selectively holding the first rotational element against rotation and releasing the first rotational element;

a second brake selectively holding the fourth ring gear against rotation and releasing the fourth ring gear; and a third brake selectively holding the first planetary carrier against rotation and releasing the first planetary carrier.

6. An automatic transmission for a vehicle, comprising:

an input shaft connected to an output shaft of an engine;

an output shaft connected to an axle shaft via a differential gear;

a torque converter for transmitting driving torque from the engine to the automatic transmission;

a planetary gear system comprising first, second, third and fourth planetary gear sets, the first gear set having a first sun gear, a first ring gear, a pair of first pinion gears meshing with the first sun gear and the first ring gear, and a first planetary carrier rotatably supporting the first pinion gears, the first sun gear being connected to the input shaft, the second, third and fourth gear sets respectively having second, third and fourth sun gears, second, third and fourth ring gears, second, third and fourth single pinion gears meshing with each sun gear and ring gear, and second, third and fourth planetary carriers rotatably supporting the second, third and fourth pinion gears;

a first rotational element rotatably connecting the first ring gear and the second sun gear;

a second rotational element rotatably connecting the second and fourth planetary carriers, and the third ring gear;

a third rotational element rotatably connecting the second ring gear, the third planetary carrier and the fourth sun gear to the output shaft;

a fourth rotational element rotatably connecting the third sun gear and the input shaft;

a first clutch selectively connecting and releasing the second planetary carrier and the third ring gear;

a second clutch selectively connecting and releasing the second rotational element and the input shaft;

a first brake selectively holding the first rotational element against rotation and releasing the first rotational element;

a second brake selectively holding the fourth ring gear against rotation and releasing the fourth ring gear; and a third brake selectively holding the first planetary carrier against rotation and releasing the first planetary carrier.

7. An automatic transmission for a vehicle, comprising:

an input shaft connected to an output shaft of an engine;

an output shaft connected to an axle shaft via a differential gear;

a torque converter for transmitting driving torque from the engine to the automatic transmission;

a planetary gear system comprising first, second, third and fourth planetary gear sets, the first gear set having a first sun gear, a first ring gear, a pair of first pinion gears meshing with the first sun gear and the first ring gear, and a first planetary carrier rotatably supporting the first pinion gears, the first planetary carrier being connected to the input shaft, the second, third and fourth gear sets respectively having second, third and fourth sun gears, second, third and fourth ring gears, second, third and fourth single pinion gears meshing with each sun gear and ring gear, and second, third and fourth planetary carriers rotatably supporting the second, third and fourth pinion gears;

a first rotational element rotatably connecting the first ring gear and the second sun gear;

a second rotational element rotatably connecting the second and fourth planetary carriers, and the third ring gear;

a third rotational element rotatably connecting the second ring gear, the third planetary carrier, the fourth sun gear to the output shaft;

a fourth rotational element rotatably being connected to the third sun gear;

a first clutch selectively connecting and releasing the fourth rotational element and the input shaft;

a second clutch selectively connecting and releasing the second rotational element and the input shaft;

a first brake selectively holding the first rotational element against rotation and releasing the first rotational element;

a second brake selectively holding the fourth ring gear against rotation and releasing the fourth ring gear; and a third brake selectively holding the first sun gear against rotation and releasing the first sun gear.

8. An automatic transmission for a vehicle, comprising:

an input shaft connected to an output shaft of an engine;

an output shaft connected to an axle shaft via a differential gear;

a torque converter for transmitting driving torque from the engine to the automatic transmission;

a planetary gear system comprising first, second, third and fourth planetary gear sets, the first gear set having a first sun gear, a first ring gear, a pair of first pinion gears meshing with the first sun gear and the first ring gear, and a first planetary carrier rotatably supporting the first pinion gears, the first planetary carrier being connected to the input shaft, the second, third and fourth gear sets respectively having second, third and fourth sun gears, second, third and fourth ring gears, second, third and fourth single pinion gears meshing with each sun gear and ring gear, and second, third and fourth planetary carriers rotatably supporting the second, third and fourth pinion gears;

a first rotational element rotatably connecting the first ring gear and the second sun gear;

a second rotational element rotatably connecting the second and fourth planetary carriers, and the third ring gear;

a third rotational element rotatably connecting the second ring gear, the third planetary carrier and the fourth sun gear to the output shaft;

a fourth rotational element rotatably connecting the third sun gear and the input shaft;

a first clutch selectively connecting and releasing the second planetary carrier and the third ring gear;

a second clutch selectively connecting and releasing the second rotational element and the input shaft;

a first brake selectively holding the first rotational element against rotation and releasing the first rotational element;

a second brake selectively holding the fourth ring gear against rotation and releasing the fourth ring gear; and a third brake selectively holding the first sun gear against rotation and releasing the first sun gear.

9. An automatic transmission for a vehicle, comprising:

an input shaft connected to an output shaft of an engine;

an output shaft connected to an axle shaft via a differential gear;

a torque converter for transmitting driving torque from the engine to the automatic transmission;

a planetary gear system comprising first, second, third and fourth planetary gear sets, the first gear set having a first sun gear, a first ring gear, a pair of first pinion gears meshing with the first sun gear and the first ring gear, and a first planetary carrier rotatably supporting the first pinion gears, the first sun gear being connected to the input shaft, the second, third and fourth gear sets respectively having second, third and fourth sun gears, second, third and fourth ring gears, second, third and fourth single pinion gears meshing with each sun gear and ring gear, and second, third and fourth planetary carriers rotatably supporting the second, third and fourth pinion gears;

a first rotational element rotatably connecting the first ring gear and the second sun gear;

a second rotational element rotatably connecting the second planetary carrier and the third ring gear;

a third rotational element rotatably connecting the second ring gear and the third and fourth planetary carriers to the output shaft;

a fourth rotational element rotatably connecting the third and fourth sun gears;

a first clutch selectively connecting and releasing the fourth rotational element and the input shaft;

a second clutch selectively connecting and releasing the second rotational element and the input shaft;

a first brake selectively holding the first rotational element against rotation and releasing the first rotational element;

a second brake selectively holding the fourth ring gear against rotation and releasing the fourth ring gear; and a third brake selectively holding the first planetary carrier against rotation and releasing the first planetary carrier.

10. An automatic transmission for a vehicle, comprising:

an input shaft connected to an output shaft of an engine;

an output shaft connected to an axle shaft via a differential gear;

a torque converter for transmitting driving torque from the engine to the automatic transmission;

a planetary gear system comprising first, second, third and fourth planetary gear sets, the first gear set having a first sun gear, a first ring gear, a pair of first pinion gears meshing with the first sun gear and the first ring gear, and a first planetary carrier rotatably supporting the first pinion gears, the first planetary carrier being connected to the input shaft, the second, third and fourth gear sets respectively having second, third and fourth sun gears, second, third and fourth ring gears, second, third and fourth single pinion gears meshing with each sun gear and ring gear, and second, third and fourth planetary carriers rotatably supporting the second, third and fourth pinion gears;

a first rotational element rotatably connecting the first ring gear and the second sun gear;

a second rotational element rotatably connecting the second planetary carrier and the third ring gear;

a third rotational element rotatably connecting the second ring gear and the third and fourth planetary carriers to the output shaft;

a fourth rotational element rotatably being connected to the fourth sun gear;

a first clutch selectively connecting and releasing the fourth rotational element and the input shaft;

a second clutch selectively connecting and releasing the second rotational element and the input shaft;

a first brake selectively holding the first rotational element against rotation and releasing the first rotational element;

a second brake selectively holding the fourth ring gear against rotation and releasing the fourth ring gear; and a third brake selectively holding the first sun gear against rotation and releasing the first sun gear.

11. An automatic transmission for a vehicle, comprising:

an input shaft connected to an output shaft of an engine;

an output shaft connected to an axle shaft via a differential gear;

a torque converter for transmitting driving torque from the engine to the automatic transmission;

a planetary gear system comprising first, second and third planetary gear sets, the first gear set having a first sun gear, a first ring gear, a pair of first pinion gears meshing with the first sun gear and the first ring gear, and a first planetary carrier rotatably supporting the first pinion gears, the second and third gear sets respectively having second and third sun gears, second and third ring gears, second and third single pinion gears meshing with each sun gear and ring gear, and second and third planetary carriers rotatably supporting the second and third pinion gears;

a first rotational element rotatably connecting the first ring gear and the second sun gear, connecting the second and third planetary gear sets;

a second rotational element rotatably connected to the second planetary carrier;

a third rotational element rotatably connecting the third planetary carrier and the output shaft;

a fourth rotational element connected to the third sun gear;

a planetary gear unit including the second and third planetary gear sets and the first, second, third and fourth rotational elements, the planetary gear unit connecting the second planetary carrier and the third ring gear, and connecting the second ring gear and the third planetary carrier;

a first clutch selectively connecting and releasing the input shaft and the second rotational element;

a second clutch selectively connecting and releasing the input shaft and the first sun gear;

a third clutch selectively connecting and releasing the first sun gear and the first planetary carrier;

a first brake selectively holding the first planetary carrier against rotation and releasing the first planetary carrier;

a second brake selectively holding the second rotational element against rotation and releasing the second rotational element; and a third brake selectively holding the fourth rotational element against rotation and releasing the fourth rotational element.

12. An automatic transmission for a vehicle, comprising:

an input shaft connected to an output shaft of an engine;

an output shaft connected to an axle shaft via a differential gear;

a torque converter for transmitting driving torque from the engine to the automatic transmission;

a planetary gear system comprising first, second and third planetary gear sets, the first gear set having a first sun gear, a first ring gear, a pair of first pinion gears meshing with the first sun gear and the first ring gear, and a first planetary carrier rotatably supporting the first pinion gears, the second and third gear sets respectively having second and third sun gears, second and third ring gears, second and third single pinion gears meshing with each sun gear and ring gear, and second and third planetary carriers rotatably supporting the second and third pinion gears;

a first rotational element rotatably connected to the third ring gear;

a second rotational element rotatably connected to the second ring gear;

a third rotational element rotatably connected to the second planetary carrier;

a fourth rotational element rotatably connected to the third sun gear;

a planetary gear unit including the second and third planetary gear sets and the first, second, third and fourth rotational elements, the planetary gear unit connecting the second ring gear and the third planetary carrier, and connecting the second and third sun gears;

a first clutch selectively connecting and releasing the input shaft and the second rotational element;

a second clutch selectively connecting and releasing the input shaft and the first sun gear;

a third clutch selectively connecting and releasing the first sun gear and the first planetary carrier;

a first brake selectively holding the first planetary carrier against rotation and releasing the first planetary carrier;

a second brake selectively holding the second rotational element against rotation and releasing the second rotational element; and a third brake selectively holding the fourth rotational element against rotation and releasing the fourth rotational element.

13. An automatic transmission for a vehicle, comprising:

an input shaft connected to an output shaft of an engine;

an output shaft connected to an axle shaft via a differential gear;

a torque converter for transmitting driving torque from the engine to the automatic transmission;

a planetary gear system comprising first, second and third planetary gear sets, the first gear set having a first sun gear, a first ring gear, a pair of first pinion gears meshing with the first sun gear and the first ring gear, and a first planetary carrier rotatably supporting the first pinion gears, the second and third gear sets respectively having second and third sun gears, second and third ring gears, second and third single pinion gears meshing with each sun gear and ring gear, and second and third planetary carriers rotatably supporting the second and third pinion gears;

a first rotational element rotatably connected to the second ring gear;

a second rotational element rotatably connected to the second planetary carrier;

a third rotational element rotatably connected to the third ring gear;

a fourth rotational element rotatably connected to the second sun gear;

a planetary gear unit including the second and third planetary gear sets and the first, second, third and fourth rotational elements, the planetary gear unit connecting the second and third planetary carriers, and connecting the second ring gear and the third sun gear;

a first clutch selectively connecting and releasing the input shaft and the second rotational element;

a second clutch selectively connecting and releasing the input shaft and the first sun gear;

a third clutch selectively connecting and releasing the first sun gear and the first planetary carrier;

a first brake selectively holding the first planetary carrier against rotation and releasing the first planetary carrier;

a second brake selectively holding the second rotational element against rotation and releasing the second rotational element; and a third brake selectively holding the fourth rotational element against rotation and releasing the fourth rotational element.

* * * * *